US012060685B2

(12) United States Patent
Cooper

(10) Patent No.: US 12,060,685 B2
(45) Date of Patent: Aug. 13, 2024

(54) SLIP FORMING STRUCTURES USING MULTIPLE MOLDS

(71) Applicant: Howard Cooper, Corona, CA (US)

(72) Inventor: Howard Cooper, Corona, CA (US)

( * ) Notice: Subject to any disclaimer, the term of this patent is extended or adjusted under 35 U.S.C. 154(b) by 48 days.

(21) Appl. No.: 17/316,447

(22) Filed: May 10, 2021

(65) Prior Publication Data

US 2022/0098803 A1 Mar. 31, 2022

Related U.S. Application Data

(63) Continuation of application No. 16/378,372, filed on Apr. 8, 2019, now Pat. No. 11,008,714.

(60) Provisional application No. 62/655,076, filed on Apr. 9, 2018.

(51) Int. Cl.

*E01C 19/00* (2006.01)
*B28B 1/08* (2006.01)
*E01C 19/48* (2006.01)
*E04G 11/22* (2006.01)
*E04G 21/02* (2006.01)
*E04G 21/04* (2006.01)
*E01D 21/06* (2006.01)
*E01F 15/08* (2006.01)

(52) U.S. Cl.

CPC .......... *E01C 19/4886* (2013.01); *B28B 1/084* (2013.01); *E04G 11/22* (2013.01); *E04G 21/025* (2013.01); *E04G 21/04* (2013.01); *E01D 21/06* (2013.01); *E01F 15/083* (2013.01)

(58) Field of Classification Search

CPC .. E01C 19/4886; E01C 19/48; E01C 19/4883; E01C 19/484; E01C 19/4853; E01C 19/4893; E04G 21/049

See application file for complete search history.

(56) References Cited

U.S. PATENT DOCUMENTS

| | | | |
|---|---|---|---|
| 857,587 | A | 6/1907 | Boyle |
| 945,312 | A | 1/1910 | Firth |
| 2,014,826 | A | 9/1935 | Wildrick |
| 3,200,177 | A | 8/1965 | Dodd |

(Continued)

FOREIGN PATENT DOCUMENTS

| | | | |
|---|---|---|---|
| FR | 2684399 | A1 | 6/1993 |
| FR | 2697036 | A1 | 4/1994 |
| GB | 2231904 | A | 11/1990 |

OTHER PUBLICATIONS

Green, Jonathan, Technical Guidance Sheet S3-Slip-formed Slot Drain, Sep. 2001, Britpave, 1-2, http://www.britpave.org.uk/uploads/documents/originals/tgs_s3.pdf.

(Continued)

*Primary Examiner* — Timothy Kennedy

(74) *Attorney, Agent, or Firm* — Knobbe, Martens, Olson & Bear, LLP

(57) ABSTRACT

A method of slip forming a concrete structure can include using a first slip form mold that travels along a path to form a portion of a concrete structure by delivering a first flow of concrete into the first mold through a first hopper. The first hopper can be configured to receive the first flow of concrete. The portion of the concrete structure can be modified using a second slip form mold different from the first mold by advancing the second mold along the concrete structure and, while advancing the second mold, delivering a second flow of concrete into the second mold through a second hopper that is configured to receive the second flow of concrete.

12 Claims, 15 Drawing Sheets

(56) References Cited

U.S. PATENT DOCUMENTS

| | | | |
|---|---|---|---|
| 3,530,552 | A | 9/1970 | Calder |
| 3,600,773 | A | 8/1971 | Davis et al. |
| 3,832,079 | A | 8/1974 | Moorhead |
| 3,898,778 | A | 8/1975 | Erickson et al. |
| 4,073,592 | A | 2/1978 | Godberson et al. |
| 4,084,928 | A | 4/1978 | Petersik |
| 4,211,743 | A | 7/1980 | Nauta et al. |
| 4,490,067 | A | 12/1984 | Dahowski |
| 4,512,121 | A | 4/1985 | Carydias et al. |
| 4,526,493 | A | 7/1985 | Hall et al. |
| 4,533,111 | A | 8/1985 | Cousin et al. |
| 4,553,875 | A | 11/1985 | Casey |
| 4,872,823 | A | 10/1989 | Howard |
| 5,033,906 | A | 7/1991 | Jordan |
| 5,173,309 | A | 12/1992 | Belarde |
| 5,290,492 | A | 3/1994 | Belarde |
| 5,292,467 | A | 3/1994 | Mandish et al. |
| 5,421,670 | A | 6/1995 | Meirick |
| 5,533,888 | A | 7/1996 | Belarde |
| 5,616,291 | A | 4/1997 | Belarde |
| 5,735,634 | A | 4/1998 | Ulrich et al. |
| 5,993,108 | A | 11/1999 | Buhman |
| 6,293,728 | B1 | 9/2001 | Eggleton et al. |
| 6,394,410 | B1 | 5/2002 | Thompson |
| 6,540,435 | B1 | 4/2003 | Lizarraga |
| 6,709,195 | B2 | 3/2004 | Piccoli et al. |
| 6,817,849 | B1 | 11/2004 | Taylor |
| 6,923,630 | B2 | 8/2005 | Allen |
| 7,264,418 | B1 | 9/2007 | Houck |
| 7,357,861 | B2 | 4/2008 | Kelley et al. |
| 8,342,773 | B2 | 1/2013 | Kropacek |
| 9,797,099 | B2 | 10/2017 | Engels et al. |
| 9,869,066 | B2 | 1/2018 | Cooper |
| 11,008,714 | B2 | 5/2021 | Cooper |
| 2005/0194195 | A1 | 9/2005 | Francois |
| 2009/0053345 | A1 | 2/2009 | Martins et al. |
| 2010/0201994 | A1 | 8/2010 | Buehlmann |
| 2011/0227241 | A1 | 9/2011 | Nave et al. |
| 2016/0340840 | A1 | 11/2016 | Yun |
| 2018/0334780 | A1 | 11/2018 | Cooper |

OTHER PUBLICATIONS

Summary of Federal Highway Administration's Drainage Efforts—Pavements—FHWA, 4 pages, Feb. 5, 2002, www.fhwa.dot.gov/Pavement/drain.cfm.

Gaine CF pamphlet, Interface Développement, believed to be published around Nov. 2006.

Abstract, Drainage Evaluation at the U.S. 50 Joint Sealant Experiment, J. Transp. Engineering, vol. 13, Issue 8, 2007, viewed at http://dx.doi.org/10.1061/(ASCE)0733-947X(2007)133:8(480).

Miller Formless, M-1000 Curb & Gutter Machine, 2 pages, retrieved Nov. 6, 2009, www.millerformless.com/m1000specs.html.

SLIP FORMING STRUCTURES USING MULTIPLE MOLDS

CROSS-REFERENCE TO RELATED APPLICATIONS

This application is a continuation application of U.S. patent application Ser. No. 16/378,372, filed on Apr. 8, 2019, entitled "SLIP FORMING STRUCTURES USING MULTIPLE MOLDS", which claims the benefit of priority under 35 U.S.C. § 119(e) to U.S. Provisional Application No. 62/655,076, filed on Apr. 9, 2018, entitled "SLIP FORMING STRUCTURES USING MULTIPLE MOLDS," which are hereby incorporated by reference herein in their entireties.

BACKGROUND

Field

This disclosure relates generally to forming structures using slip forming techniques.

Description of Related Art

Slip forming concrete structures, for example along a horizontal axis, can be done in a number of ways. Structures such as curbs, barriers, or other structures are commonly formed using a slip forming process. Generally, long portions of a structure may be formed in a single pass of a slip form machine. A single machine may be used to provide the initial slip forming of the structure. Frequently, additional touch-up and repairs by humans may be recommended or required, as the process has natural inconsistencies associated with it. While some advances in the slip form process have been made, significant challenges still exist that are difficult to overcome. The slip form process is messy and often unpredictable.

Machines have been improved over the years to support additional functionality, such as in laying roads or curved structures. However, many features are still lacking and many problems exist in the art for which this application provides solutions.

SUMMARY

In certain embodiments, a method of slip forming a concrete structure can include using a first slip form mold that travels along a path to form a portion of a concrete structure by delivering a first flow of concrete into the first mold through a first hopper. The first hopper can be configured to receive the first flow of concrete. The portion of the concrete structure can be modified using a second slip form mold different from the first mold by advancing the second mold along the concrete structure and, while advancing the second mold, delivering a second flow of concrete into the second mold through a second hopper that is configured to receive the second flow of concrete. In some embodiments, a system for slip molding a concrete structure can include a first slip forming vehicle. The first slip forming vehicle can include a first hopper, a first delivery system that is configured to deliver a first flow of concrete to the first hopper, and a first slip form mold that is configured to receive the flow of concrete from the first hopper. The system can further include a second slip forming vehicle that includes a second hopper. The second hopper can include a vibration device. The second slip forming vehicle can include a second delivery system that is configured to deliver a second flow of concrete to the second hopper as well as a second slip form mold. The second slip form mold can be configured to receive the second flow of concrete from the second hopper. The second slip form mold can be spaced from the first slip form mold by a following distance.

In certain embodiments, a system for modifying an existing concrete structure can include a modifying mold that is configured to extend across a top portion of an existing concrete structure. The modifying mold can be configured to extend at least partially along a side portion of the existing concrete structure and to travel along a substantially horizontal direction of travel. The modifying mold may be configured to be guided along at least one side of the existing concrete structure. The system may further include a concrete delivery system that is in fluid communication with the modifying mold. The concrete delivery system can be configured to receive liquid concrete. The system may further include a vibrator that is configured to promote a fluid consistency of the liquid concrete and/or compaction of the liquid concrete within the mold. The vibrator can be in fluid communication with the concrete delivery system and with the modifying mold.

In some embodiments, a system for modifying an existing structure can include a modifying mold that is configured to extend across a top portion of an existing structure and to extend at least partially along a side portion of the existing structure. The modifying mold can be configured to travel along a substantially horizontal direction of travel and to be guided along at least one side of the existing structure. The system may include a material delivery system that is in fluid communication with the modifying mold. The material delivery system can be configured to receive liquid material. The system may include a vibrator that is configured to promote a fluid consistency of the liquid material and/or compaction of the liquid material within the mold. The vibrator can be configured to be in fluid communication with the material delivery system and with the modifying mold.

BRIEF DESCRIPTION OF THE DRAWINGS

The following drawings and the associated descriptions are provided to illustrate embodiments of the present disclosure and do not limit the scope of the claims and/or examples.

Figure 1A:
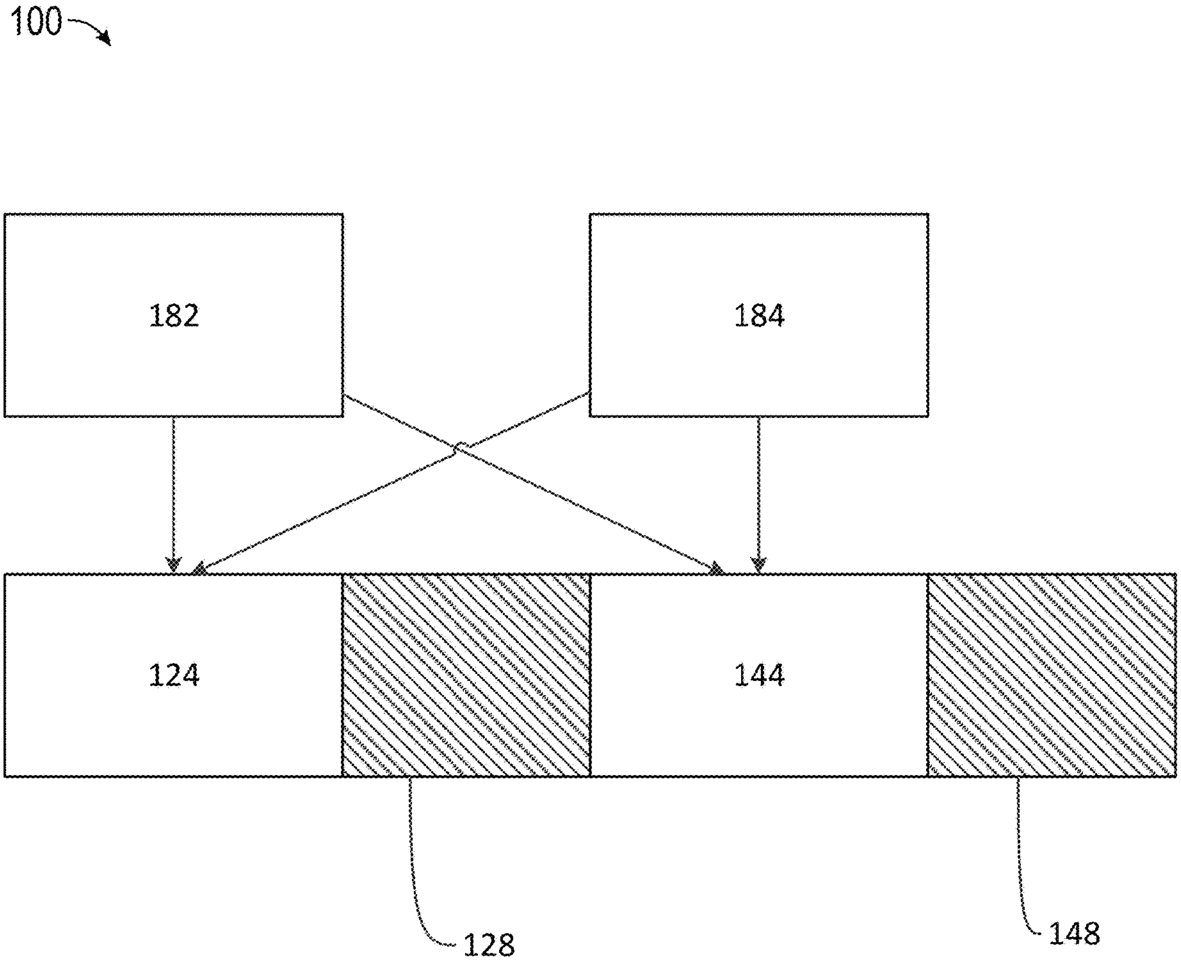
FIG. 1A schematically shows a system for slip-forming concrete structures.

These and other features will now be described with reference to the drawings summarized above. The drawings and the associated descriptions are provided to illustrate embodiments and not to limit the scope of any claim or example. Throughout the drawings, reference numbers may be reused to indicate correspondence between referenced elements.

DETAILED DESCRIPTION

Although certain embodiments and examples are disclosed below, inventive subject matter extends beyond the specifically disclosed embodiments to other alternative embodiments and/or uses and to modifications and equivalents thereof. Thus, the scope of the claims and/or examples appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Described herein are methodologies and related systems for slip forming concrete structures. It will be understood that although the description herein is in the context of vertical structures along a horizontal axis, one or more features of the present disclosure can also be implemented in slip forming horizontal structures along a horizontal axis, horizontal structures along a vertical axis, vertical structures along a vertical axis, or other dispositions of structures. Moreover, while concrete will be discussed primarily herein, the description herein may apply to other materials that a person of ordinary skill in the art would understand to be used in slip-formed structures.

Unless explicitly indicated otherwise, terms as used herein will be understood to imply their customary and ordinary meaning.

Slip form machines may be used to lay down concrete (e.g., liquid concrete) in one or more structures. The structure may include structure generally along any path, such as horizontal paths (e.g., roads, barriers, curbs, etc.) and/or vertical paths (e.g., buildings, towers, etc.). Paths may include straight lines, curves, or other shapes. Slip form machines can be used to form vertical structures (e.g., towers, barriers, buildings, etc.) and/or horizontal structures (e.g., roads, surfaces, curbs, etc.). As defined herein, vertical structures include structures that generally have a greater vertical dimension than horizontal dimension. Similarly, horizontal structures may be defined as structures that generally have a larger horizontal dimension than vertical dimension. The slip form machine may be a vehicle able to form structures by travelling along a defined path.

After a concrete structure has been slip formed, it may undergo slump. Slump may occur in a variety of ways. For example, concrete may collapse from an original height, which may result in a structure that is shorter and wider than originally formed. Concrete may shear such that the original general shape is not maintained. This may involve portions that break apart from the structure and/or collapse. Slump may also result simply in a mild shortening and/or bowing of the concrete around a mid-section of the structure. This may be referred to as true slump. An amount of slump may be in part determined by the weight of the concrete, the moisture content of the concrete, the composition of the concrete, and/or the shape of the concrete structure. If a structure is unable to support its own weight, slump is likely to occur. Systems for slip forming may form the concrete structure over reinforcing bars. The reinforcing bars may form their own skeleton or structure over which the concrete structure may be formed. This may add strength to the resulting structure and may help prevent slump. Further details on this and related features may be found in U.S. Pat. No. 9,869,066 (application Ser. No. 14/555,094), filed Nov. 26, 2014, the entire disclosure of which is hereby incorporated by reference.

Concrete (or other material) used in a slip forming process may require a certain consistency or workability. Concrete that is too wet may not sufficiently retain its slip formed shape. By contrast, concrete that is too dry may not be sufficiently formable into a desired shape. Concrete that is sufficiently formable or workable may be referred to as being in a plastic state or maintaining its plasticity.

Slip formed structures have been traditionally formed using a single slip form machine (e.g., vehicle). Often additional work may be advantageous or even required to bring the quality and/or dimensions up to necessary particular specifications. For example, a work contract may specify a certain height, width, level of smoothness, and/or other standard. However, it can be labor intensive to adjust, reform, or add on to an existing slip-formed structure that satisfies the required specifications. Workers may have to manually add concrete to the top of the structure to bring it up to a specified height and/or may need to repair portions that have collapsed. Such added concrete may not combine with the previously poured concrete in a satisfactory way and may be prone to further damage, discoloration, or disrepair in the future. For example, the composition of the added concrete may not match the particular composition of the concrete previously poured. Further, when added by hand the added concrete is not vibrated into position the way the originally poured concrete is and may not compact in a structurally sound way. If the slump (e.g., collapse) is too drastic, work may need to be slowed or stopped to accommodate for the delay in adjusting the slip-formed structure. This can run the risk of delaying a project, reducing the quality of the project, and/or increasing a cost of a project. While additional work, such as aesthetic work (e.g., brooming to create a particular texture) may be helpful, frequently workers may be busy with supplying quality finishing touches to a concrete structure that attention to aesthetic work may be rushed or overlooked.

Moreover, under certain conditions time may be of the essence in adjusting the slip-formed structure to meet the specified standards. For example, concrete that is already relatively dry and has been formed into a structure may require immediate attention before alterations and/or additions are no longer possible and/or desirable. For example, if the concrete is As an additional example, certain climates (e.g., hot and dry climates) may cause the concrete to quickly lose its plasticity, thus necessitating immediate attention and additional labor. Certain concrete may be mixed with base ingredients that dry more rapidly than others, thus also presenting time constraints. The implementations described herein can be effective at mitigating or removing many of these challenges, such as, for example, reducing the overall amount of human labor required.

In some embodiments, one or more slip form machines may be used to provide multiple (e.g., two) slip form apparatuses operable in series to overcome such challenges. These apparatuses can form a slip form system that may significantly reduce or even eliminate the need for additional human labor once the structure has been slip formed using the system. A first slip form mold may operate simultaneous with or before a second slip form mold. For example, the first and second slip form molds may be spatially and/or temporally displaced from one another. In some embodiments, a single slip form machine can include the first and second slip form molds. Alternatively, the first slip form mold may be carried by a first slip form machine and the second slip form mold may be carried by a second slip form machine. In some embodiments, the size of the first mold may be larger than the second mold. Additionally or alternatively, the first slip form mold may be configured to handle a greater flow of concrete and/or form a larger slip-formed structure than the second machine.

Because of the amount of concrete needed to complete a job may involve many concrete loads, the slip form apparatuses are adapted to receive batches of concrete from various sources or deliveries. As each batch may include a concrete with a different composition (e.g., different moisture content, base aggregate, etc.), it may be advantageous to blend a new batch of concrete with the old batch of concrete. Advantageously, both the first and second molds can receive concrete from the same batch which allows the finish molding by the second mold to cleanly blend with the original pour from the first mold. However, in certain circumstances, the concrete received from various suppliers may be inconsistent and therefore result in receiving slightly different concrete makeup within each machine and/or within a single batch of concrete. Traditionally, this has caused challenges when slip forming. However, the use of multiple slip forming machines may reduce the challenges associated therewith. Variations in a preliminary concrete structure may be smoothed by a later (e.g., second) slip form machine. Moreover, one or both of the first and second molds may be adapted to receive concrete from different batches simultaneously. By blending a current batch of concrete with a new batch of concrete, the seams that may naturally arise from using multiple batches of concrete with a slip forming machine can be smoothed reduced or minimized. Using a second mold to finish the structure while the original pour is still in a workable state provides a cleaner finished product with increased structural integrity. Whereas with a traditional slip forming machine, visual defects (e.g., patched-up look) may not have been properly smoothed by a manual laborer, a multiple-machine system or multiple-mold system may reduce or eliminate such visual defects.

FIG. 1A schematically shows an example slip forming system 100 that includes a first slip form mold 124 and a second slip form mold 144. The first slip form mold 124 may produce a preliminary concrete structure 128 and the second slip form mold 144 can modify the structure to form a final concrete structure 148. Modifying the concrete structure may include adding concrete, removing concrete, altering a texture, adjusting one or more dimensions, changing a shape, and/or altering an orientation and/or position of the structure. The slip forming system 100 may include one or more vehicles for forming the final concrete structure 148 (e.g., concrete structure). The first slip form mold 124 and second slip form mold 144 may be part of a single machine or part of two separate machines working together.

One or more of the first slip form mold 124 and the second slip form mold 144 may be configured to receive one or more sources of concrete during a job. It may be advantageous for the slip forming system 100 to deliver concrete from the same first concrete source 182 for as long as possible. However, under certain circumstances, a second concrete source 184 can supply the slip forming system 100 with the needed concrete. For example, certain concrete structures may be concrete-intensive such that multiple loads of concrete from various sources may be necessary. In other circumstances, a particular load of concrete is undesirable due to its consistency and/or makeup. Other reasons exist as well.

In certain embodiments, the slip forming system 100 can be configured to receive from the first concrete source 182 and deliver the same batch of concrete to each of the first slip form mold 124 and the second slip form mold 144. This can allow for the first slip form mold 124 and the second slip form mold 144 to form the final concrete structure 148 using the same consistency and/or makeup of the concrete through both molds.

The slip forming system 100 may be configured to receive a second batch of concrete from a second concrete source 184. In some embodiments, the slip forming system 100 is configured to mix concrete from both the first concrete source 182 and the second concrete source 184. For example, when the first concrete source 182 is nearly exhausted of concrete, the second concrete source 184 may arrive to take over the supply of the concrete. During this transition, it may be advantageous to mix the two batches to promote uniformity in the resulting final concrete structure 148 along a greater portion of the structure. As described in more detail herein, the slip forming system 100 may include apparatus to smoothly receive two batches of concrete for one or more of the molds 124, 144 and/or to mix the two batches together before delivering the mixed concrete to one or more of the molds 124, 144.

Figure 1B:
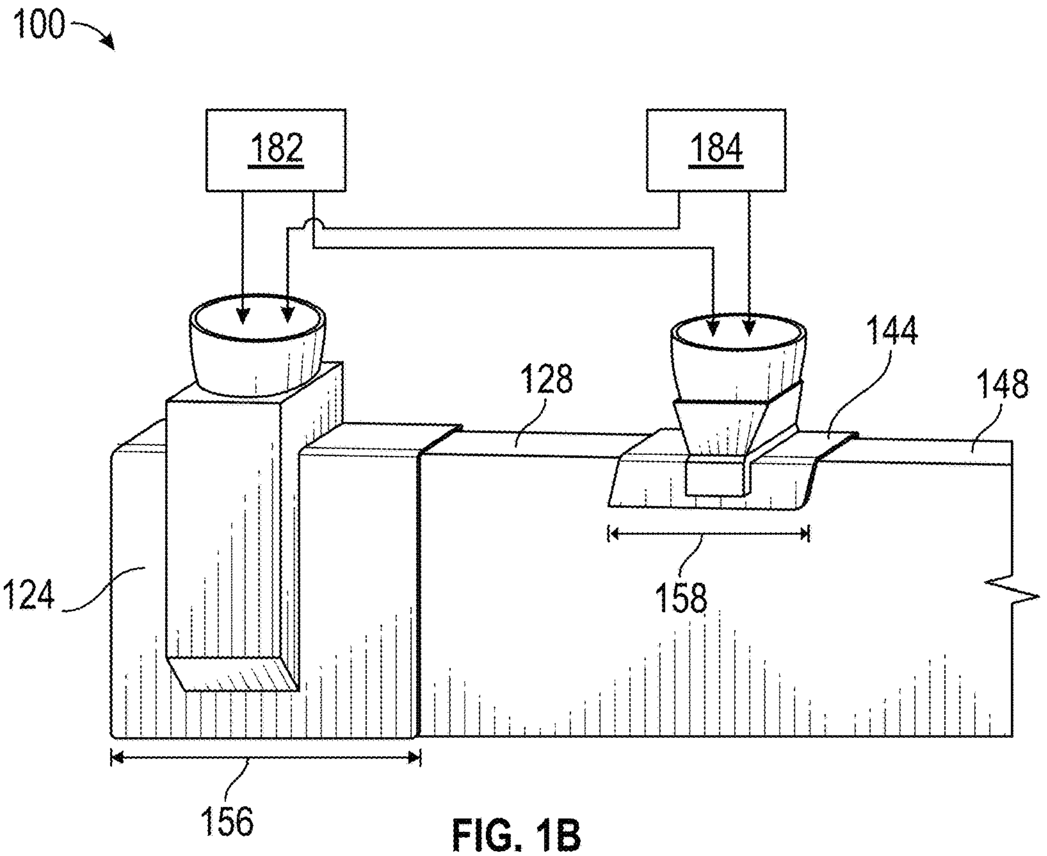
FIG. 1B shows a schematic system for slip-forming concrete structures with some details shown.

FIG. 1B schematically shows, with some example structural details, an example slip forming system 100 that includes a first slip form mold 124 and a second slip form mold 144. As described above, the first slip form mold 124 may produce a preliminary concrete structure 128 and the second slip form mold 144 can modify the structure to form a final concrete structure 148. Modifying the concrete structure may include adding concrete, removing concrete, altering a texture, adjusting one or more dimensions, changing a shape, and/or altering an orientation and/or position of the structure. The slip forming system 100 may include one or more vehicles for forming the final concrete structure 148 (e.g., concrete structure). The first slip form mold 124 and the second slip form mold 144 can have respective dimensions (e.g., the lengths 156, 158) as shown. Other details may be as described elsewhere herein.

Figure 1C:
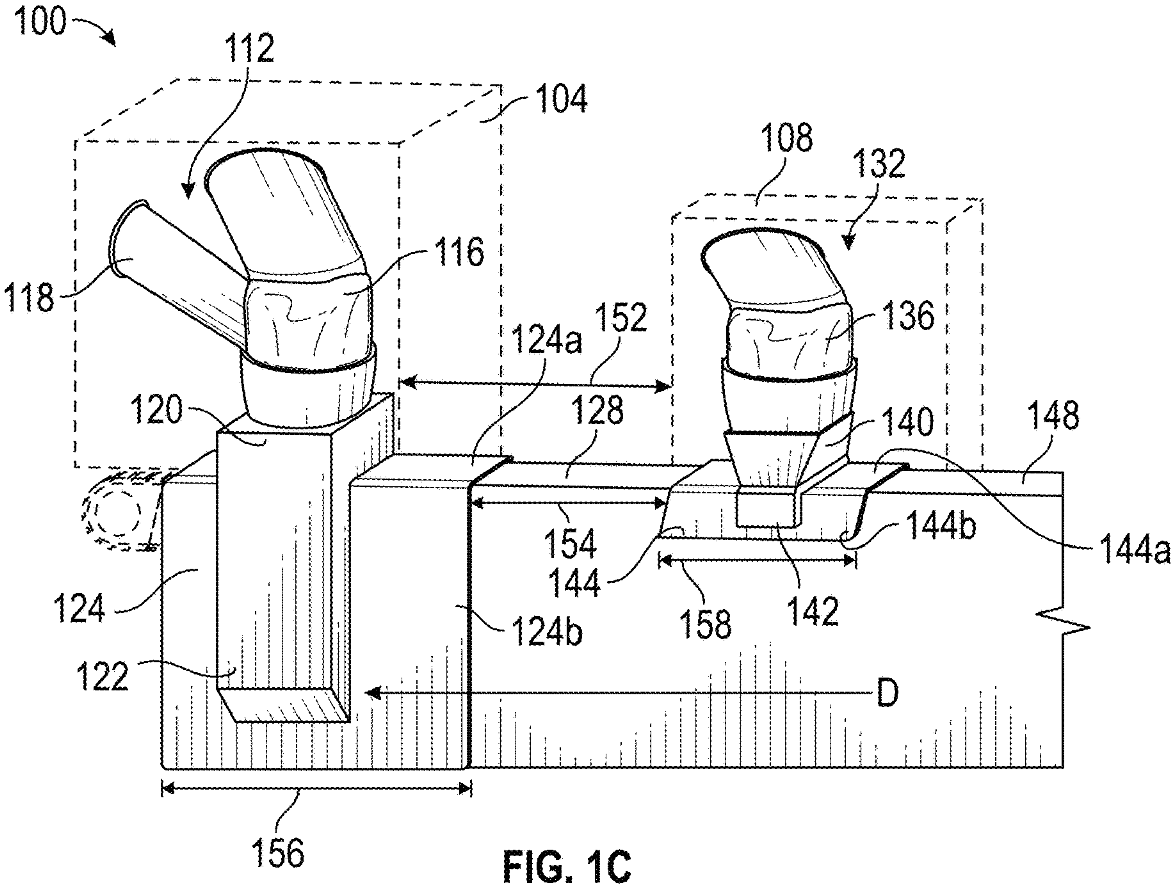
FIG. 1C schematically shows a slip forming system that includes a first slip forming vehicle and a second slip forming vehicle.

FIG. 1C schematically shows a slip forming system 100 that includes a first slip forming vehicle 104 and a second slip forming vehicle 108. The first slip forming vehicle 104 may include a first molding system 112. The first molding system 112 may include a first delivery system 116, a first hopper 120, and/or a first slip form mold 124. The first slip form mold 124 can include a mold top 124*a* and one or more mold sides 124*b*. The first slip form mold 124 may have a length 156 as measured along a direction of travel D. In some embodiments, the first slip forming vehicle 104 may include a supplemental delivery system 118. The second slip forming vehicle 108 may also include a supplemental delivery system (not shown).

A preliminary concrete structure 128 may be formed using the first molding system 112 of the first slip forming vehicle 104, as shown. The preliminary concrete structure 128 shown is a vertical structure (e.g., wall) slip formed along a horizontal path. The preliminary concrete structure 128 can have a vertical height as measured from the ground of between about 5 inches and 96 inches. In some designs, the vertical height of the preliminary concrete structure 128 is about 56 inches. Other heights may include about 32 inches, 36 inches, 42 inches, 56 inches, any value therebetween or may fall within any range created from these values. The second slip forming vehicle 108 may include a second molding system 132 that may modify and/or refine the preliminary concrete structure 128. The second molding system 132 can include a second delivery system 136, a second hopper 140, and/or a second slip form mold 144. The second slip form mold 144 may include a mold top 144*a* and one or more mold sides 144*b*. The second slip form mold 144 can have a length 158 along the direction of travel D, as shown. The second molding system 132 of the second slip forming vehicle 108 can form the final concrete structure 148. The first slip forming vehicle 104 and the second slip forming vehicle 108 can be separated by a vehicle following distance 152, measured along the direction of travel D. Though shown on separate vehicles, in some embodiments, first slip form mold 124 and second slip form mold 144 can be carried on a single vehicle with the second slip form mold being guided along the initial pour of the first slip form mold. For example, the first molding system 112 and the second delivery system 136 can be partially or fully integrated into a single vehicle. In some designs, the first and second delivery systems 116, 136 can be supplied from a common source of concrete. In embodiments where the first slip forming vehicle 104 and the second slip forming vehicle 108 are the same, the first and second molds 124, 144 may be separated by a following distance, as described herein, for example, within the same vehicle.

The first hopper 120 may be attached at a top of the first slip form mold 124. The mold top 124*a* and one or more mold sides 124*b* can define an interior of the first slip form mold 124. The interior of the first slip form mold 124 can be in fluid communication with a discharge opening (not shown) of the first delivery system 116. The first hopper 120 may be rigidly attached to the first slip form mold 124. This can allow seamless delivery of concrete or other material from the first delivery system 116 through the first hopper 120 into the first slip form mold 124. As described herein, it may be advantageous for a system to be able to seamlessly manage one or more sources of concrete. Accordingly, one or both of the delivery systems 116, 136 may include a supplemental delivery system (e.g., the supplemental delivery system 118) that can be configured to deliver a second batch of concrete through the respective hopper 120, 140 while (or shortly after) receiving a first batch through the respective delivery system 116, 136. In this way, the slip forming system 100 can be configured to mix first and second batches of concrete into a mixed batch. The mixed batch can be delivered to one or both of the first hopper 120 and/or the second hopper 140. Because different batches of concrete may have different characteristics (e.g., because of different ingredients, proportions, time after initial preparation, variation in temperature and/or humidity, etc.), it may be advantageous to mix the different batches before delivering concrete to the first slip form mold 124 and/or the second slip form mold 144.

The first hopper 120 may be connected nearer a leading end of the first slip form mold 124 than a trailing end of the first slip form mold 124, as defined by the direction of travel D. This can provide a sufficient length of the first slip form mold 124 to form and/or compress the concrete into the desired structure. The first slip form mold 124 may include a first hopper box 122. The first hopper box 122 can include an elongate portion (e.g., vertically elongate) to allow the concrete to flow where it is needed to create the preliminary concrete structure 128. The first hopper box 122 can extend from between halfway down a height of the resulting preliminary concrete structure 128 to substantially down the full height. The first hopper 120 may include within its interior (e.g., in the first hopper box 122) one or more vibration devices (not shown) to keep the concrete flowing and/or to slow the hardening of the concrete during, before, or after a delivery of the concrete or other material to the first slip form mold 124 and to help compact the concrete within the mold 124. The one or more vibration devices may additionally or alternatively be located within the first slip form mold 124 and/or first delivery system 116. The one or more vibration devices may be configured to vibrate the concrete passing through the first hopper 120 and/or into the first slip form mold 124. Vibrating the concrete can promote greater fill of the first slip form mold 124 and, therefore, a smoother resulting preliminary concrete structure 128. Vibrating the concrete may additionally or alternatively promote compression and compacting of the concrete to form a sturdier preliminary concrete structure 128. The one or more vibration devices may be housed in the first hopper box 122. For example, the vibration device may be oriented parallel to the elongation of the first hopper box 122 (e.g., vertically) to better promote flow and/or compression of the concrete.

A main body of the first slip forming vehicle 104 may be laterally (e.g., perpendicular to the direction of travel D) spaced from the first slip form mold 124 and/or the preliminary concrete structure 128. The main body of the first slip forming vehicle 104 may travel along a path parallel to a path defined by the resulting preliminary concrete structure 128. In such embodiments, this configuration can allow for adjustment of a portion of the concrete structure (e.g., preliminary concrete structure 128) without damaging or otherwise affecting the structure.

The first slip form mold 124 may be guided by one or more guides. For example, the first slip forming vehicle 104 may include a sensor that follows a guide line (not shown). The guide line may be disposed on or along the ground near the first slip forming vehicle 104 and/or opposite it from the resulting preliminary concrete structure 128. The one or more guides may include a line guide and/or a grade guide that one or more sensors track. The line and/or grade guide may be referred to as elevation and/or latitude guides. This can allow for a more consistent placement of concrete or other material and a smoother preliminary concrete structure 128. Line guides and/or grade guides may allow for precision path guidance as human quality checkers may be immediately notified of an error in the path of the machine and/or in the placement of the concrete. The line guides may include a line (e.g., string, wire, etc.) and/or a sensor (e.g., pressure sensor, motion sensor). Additionally or alternatively, some systems or elements thereof (e.g., the machines) may be guided through electronics and/or wireless technology. A virtual mapping system, such as one that employs a GPS signal and/or wirelessly defined path may be used.

The length 156 of the first mold 124 may be sufficiently great to allow the delivered concrete or other material to reasonably solidify to allow the resulting preliminary concrete structure 128 to support its own weight. In some embodiments, the length 156 of the first mold 124 is between about three and twenty feet. In some embodiments, the first mold 124 has a length 156 of about 15 feet. A height of the first slip form mold 124 (e.g., a height of the mold side **124*b*) can be such that a bottom of the mold is near (e.g., within about six inches) of the ground or of the base of the preliminary concrete structure 128. In some designs, a cross-sectional shape of the preliminary concrete structure 128 is trapezoidal. Accordingly, the mold top 124*a* and the one or more mold sides 124*b* may form two or more sides of a trapezoid. Other shapes are also possible and contemplated. The first slip form mold 124 may comprise any sufficiently rigid material. For example, the first slip form mold 124** may comprise metal (e.g., aluminum, steel, etc.), plastic, and/or hardened rubber.

The mold top **124*a* may be configured to form the concrete to a specified height to within between about ⅛ inch and ¾ inch. In some embodiments, the mold top 124*a* is configured to achieve a height to within ½ inch of a specified height. The mold sides 124*b* may be configured to form a specified width of the preliminary concrete structure 128 to within between about 1/16 inch and 1 inch. In some embodiments, the mold sides 124*b* are configured to form achieve a width to within ½ inch of the specified width. One of the mold sides 124*b* may be configured to be more rigid than another of the mold sides 124*b*. For example, it may be advantageous to drive excess concrete to one side or another (e.g., to provide a tighter tolerance on one side of the first slip form mold 124 than another). This may allow for better adjustment of the concrete structure later (e.g., by the second slip forming vehicle 108). Additionally or alternatively, it may be advantageous to include a vibration device (e.g., vibrator) within the first delivery system 116 and/or first slip form mold 124 to promote the mixing and/or compacting of the concrete. For example, the vibration device may be configured to promote a target texture (e.g., liquid texture) of liquid concrete. The second delivery system 136 and/or second slip form mold 144 may similarly include a vibration device. The vibration device can be in fluid communication with one or more of the first slip form mold 124, the first delivery system 116, and/or the first hopper 120**. Other variations are possible.

The second hopper 140 may be attached at a top of the second slip form mold 144. The second slip form mold 144 may be referred to as a “topper” mold. This may be because the second slip form mold 144 can be configured to add a layer of concrete to the top of the preliminary concrete structure 128. The second slip form mold 144 may be lighter and/or more flexible than the first slip form mold 124. This can allow for more fine-tune adjusting in the formation of the final concrete structure 148. This may increase the quality of aspects (e.g., appearance, specifications) the final concrete structure 148. The mold top **144*a* and one or more mold sides 144*b* can define an interior of the second slip form mold 144. The interior of the second slip form mold 144 can be in fluid communication with a discharge opening (not shown) of the second delivery system 136. The second hopper 140 may be rigidly attached to the second slip form mold 144. This can allow seamless delivery of concrete or other material from the second delivery system 136 through the second hopper 140 into the second slip form mold 144. The second hopper 140 may be connected nearer a leading end of the second slip form mold 144 than a trailing end of the second slip form mold 144, as defined by the direction of travel D. This can provide a sufficient length of the second slip form mold 144** to form and/or compress the concrete into the desired structure.

The second slip form mold 144 may include a second hopper box 142. The second hopper box 142 can include an elongate portion (e.g., vertically elongate) to allow the concrete to flow where it is needed to create the final concrete structure 148. The second hopper box 142 can extend from less than halfway down a height of the mold side **144*b* to substantially down the full height of the mold side 144*b*, as shown, or any height therebetween. The second hopper 140 may include within its interior one or more vibration devices (not shown) to promote more consistent flow of the concrete during, before, or after a delivery of the concrete or other material to the second slip form mold 144 and to help compact the concrete within the mold 144. Additionally or alternatively, a vibration device may be located within the second slip form mold 144 and/or the second delivery system 136 (e.g., within the second hopper box 142 and/or the first hopper box 122). The vibration device can be in fluid communication with one or more of the second slip form mold 144, the second delivery system 136, and/or the second hopper 140. The one or more vibration devices may be configured to vibrate the concrete passing through the second hopper 140 into the second slip form mold 144. Vibrating the concrete can promote greater fill of the second slip form mold 144 and, therefore, a smoother resulting final concrete structure 148. The one or more vibration devices may be housed in the second hopper box 142. For example, the vibration device may be oriented parallel to the elongation of the second hopper box 142** (e.g., vertically) to better promote flow and/or compression of the concrete.

The second slip form mold 144 can be configured to supply an additional height and/or width to the preliminary concrete structure 128. For example, the second slip form mold 144 may be configured to add between about ⅛ inch and 6 inches to the height of the preliminary concrete structure 128. This additional height may be referred to as a “topper.” In some embodiments, the second slip form mold 144 is configured to add approximately an inch to the height of the preliminary concrete structure 128. Other variations are possible. For example, the second slip form mold 144 may be configured to add approximately two, three, five, six, ten, twelve, eighteen, twenty-four, or thirty-six inches of concrete or any value therebetween or a range of any value therein or even more.

A main body of the second slip forming vehicle 108 may be laterally (e.g., perpendicular to the direction of travel D) spaced from the second slip form mold 144 and/or the final concrete structure 148. The main body of the second slip forming vehicle 108 may travel along a path parallel to a path defined by the resulting final concrete structure 148. In such embodiments, this configuration can allow for adjustment of a portion of the concrete structure (e.g., final concrete structure 148) without damaging or otherwise affecting the structure. In some embodiments, the main body of the second slip forming vehicle 108 may be disposed behind (e.g., relative to the direction of travel D) the first slip forming vehicle 104. The main bodies of the first slip forming vehicle 104 and second slip forming vehicle 108 may be disposed on the same side of the concrete structure as each other (for example, as shown in FIG. 1C). The second slip forming vehicle 108 may include a container (e.g., the second hopper 140) that is pre-filled with material (e.g., concrete). The second slip forming vehicle 108 may additionally or alternatively be configured to receive concrete from a separate vehicle (e.g., a concrete mixer).

The second slip form mold 144 may be guided by one or more guides. For example, the second slip forming vehicle 108 may include a sensor that follows a guide line (not shown). The guide line may be disposed on a ground near the second slip forming vehicle 108 and/or opposite it from the resulting final concrete structure 148. The one or more guides may include an elevation guide and/or a latitude guide that one or more sensors track. This can allow for a more consistent delivery of concrete or other material and a smoother final concrete structure 148. The one or more guides may be identical to the one or more guide lines used in conjunction with the first slip forming vehicle 104 and the first slip form mold 124.

The length 158 of the second mold 144 may be sufficiently great to allow the delivered concrete or other material to reasonably solidify without causing undue pressure on the resulting final concrete structure 148. In some embodiments, the length 158 of the second mold 144 is between about two and fifteen feet. In some embodiments, a height of the second slip form mold 144 (e.g., a height of the mold side 144*b*) can be such that a bottom of the mold is above half of a height of the resulting final concrete structure 148. However, other designs are possible (see, e.g., FIGS. 1D-1E discussed below). In some designs, a cross-sectional shape of the final concrete structure 148 is trapezoidal. Accordingly, the mold top 144*a* and the one or more mold sides 144*b* may form two or more sides of a trapezoid. Other shapes are also possible and contemplated.

The second slip form mold 144 may comprise any sufficiently rigid material. For example, the second slip form mold 144 may comprise metal (e.g., aluminum, steel, etc.), plastic, and/or hardened rubber. The mold top 144*a* may be configured to form the concrete to a specified height to within between about 1/16 inch and 3/4 inch. In some embodiments, the mold top 144*a* is configured to achieve a height to within 1/2 inch of a specified height. In some embodiments, the mold is configured to achieve a specified height. The tolerances described herein may be in reference to the specified height (e.g., to within the tolerance described). The mold sides 144*b* may be configured to form a specified width of the final concrete structure 148 to within between about 1/32 inch and 1 inch. In some embodiments, the mold sides 144*b* are configured to form achieve a width to within 1/2 inch of the specified width. The mold top 144*a* and/or mold sides 144*b* may be configured to achieve tighter tolerances than the mold top 124*a* and/or mold sides 124*b*, respectively. One of the mold sides 144*b* may be configured to be more rigid than another of the mold sides 144*b*. For example, it may be advantageous to drive excess concrete to one side or another (e.g., to provide a tighter tolerance on one side of the second slip form mold 144 than another).

One or both of the first slip forming vehicle 104 and the second slip forming vehicle 108 may travel along a path (e.g., an axis). Both machines may travel along the same path or they may be different (e.g., may be on opposite sides of a concrete structure). Each machine 104, 108 may travel at a specified velocity. For example, one or both of the machines 104, 108 may travel at between about 3 inches/minute and 15 feet/minute. Under certain conditions, it may be preferable for one or both of the machines to be travelling at between about 1 foot/minute and 5 feet/minute. In some embodiments, each machine may be configured to travel at the same velocity. For example, in some embodiments the first slip forming vehicle 104 and the second slip forming vehicle 108 are the same vehicle. In such embodiments, many elements described, for example, in FIGS. 1A-1E, may be the same. Other elements may be as described but be found in the same machine. For example, the first slip form mold 124 and the second slip form mold 144 may be disposed within the same slip form machine. Other elements described herein may be shared, however. For example, a mold following distance may nevertheless be defined between the first slip form mold 124 and the 144. Other variations are possible.

The second slip forming vehicle 108 may trail the first slip forming vehicle 104 by a vehicle following distance 152. The vehicle following distance 152 may be defined as a distance between a trailing end of the first slip forming vehicle 104 and a leading end of the second slip forming vehicle 108. The vehicle following distance 152 may be adjusted based on the temperature, humidity, weather, and/or ingredients of the concrete (or other material) applicable at the time of the slip forming. For example, the vehicle following distance 152 may be relatively shorter during hotter temperatures, lower humidity, and/or drier climate. A drier concrete mix may also cause a shorter vehicle following distance 152. The vehicle following distance 152 may be between about 10 ft and 150 ft. While the vehicle following distance 152 may frequently be measured in a spatial dimension, it can also be described using a temporal dimension. For example, the vehicle following distance 152 may be between about 1.5 minutes and 90 minutes.

The vehicle following distance 152 may be different from a mold following distance 154. However, the vehicle following distance 152 may be related. For example, the mold following distance 154 may be based on the vehicle following distance 152 and/or may be affected by a speed of travel of the first slip forming vehicle 104 and/or the second slip forming vehicle 108. The mold following distance 154 (if measured in time) may be between about 1.5 minutes and 90 minutes. Moreover, the mold following distance 154 may be similarly adjusted based on the temperature, humidity, weather, and/or ingredients of the concrete (or other material) applicable at the time of the slip forming. The mold following distance 154 may be between about 8 ft and 140 ft.

The vehicle following distance 152 and/or the mold following distance 154 may be determined by a length of time in which the concrete in the preliminary concrete structure 128 is in a plastic stage (e.g., where the concrete is still plastic). Thus, during a method of slip forming as described herein, the vehicle following distance 152 and/or mold following distance 154 may be adjusted to accommodate for changes in the weather, changes, in temperature or climate, and/or updates in a consistency of concrete received from a supplier.

Figure 1D:
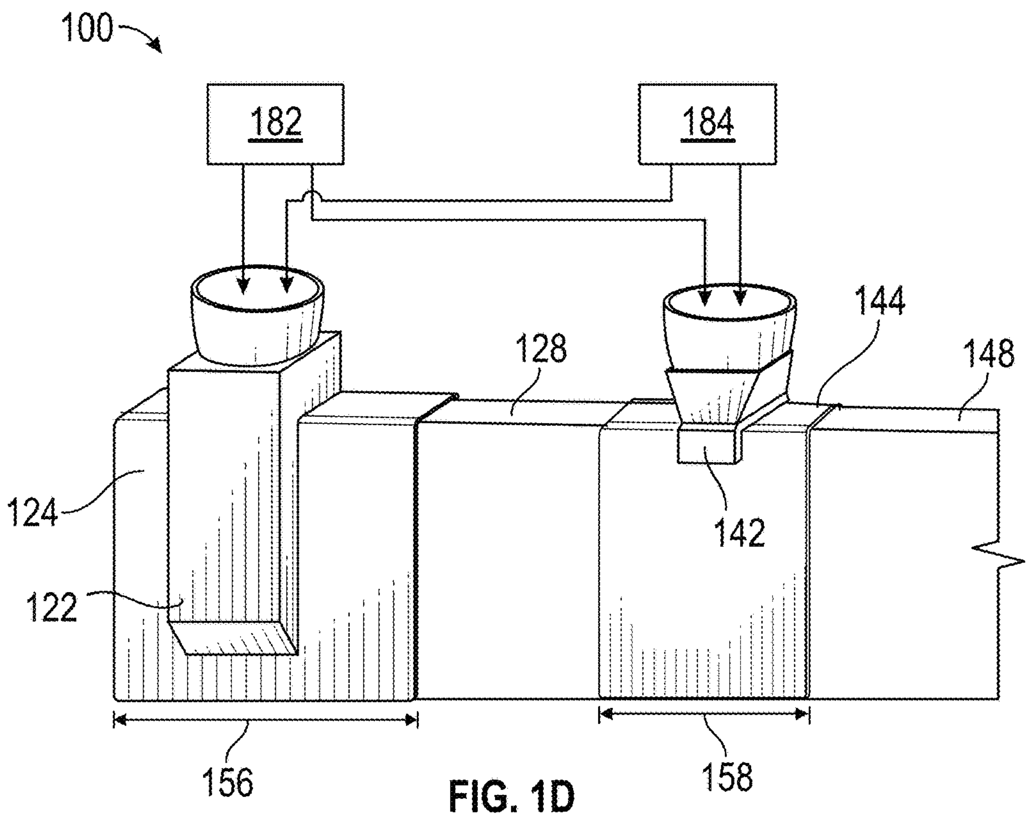
FIG. 1D shows a schematic system for slip-forming concrete structures with a second slip form mold with a height similar to a height of the preliminary concrete structure.
Figure 1E:
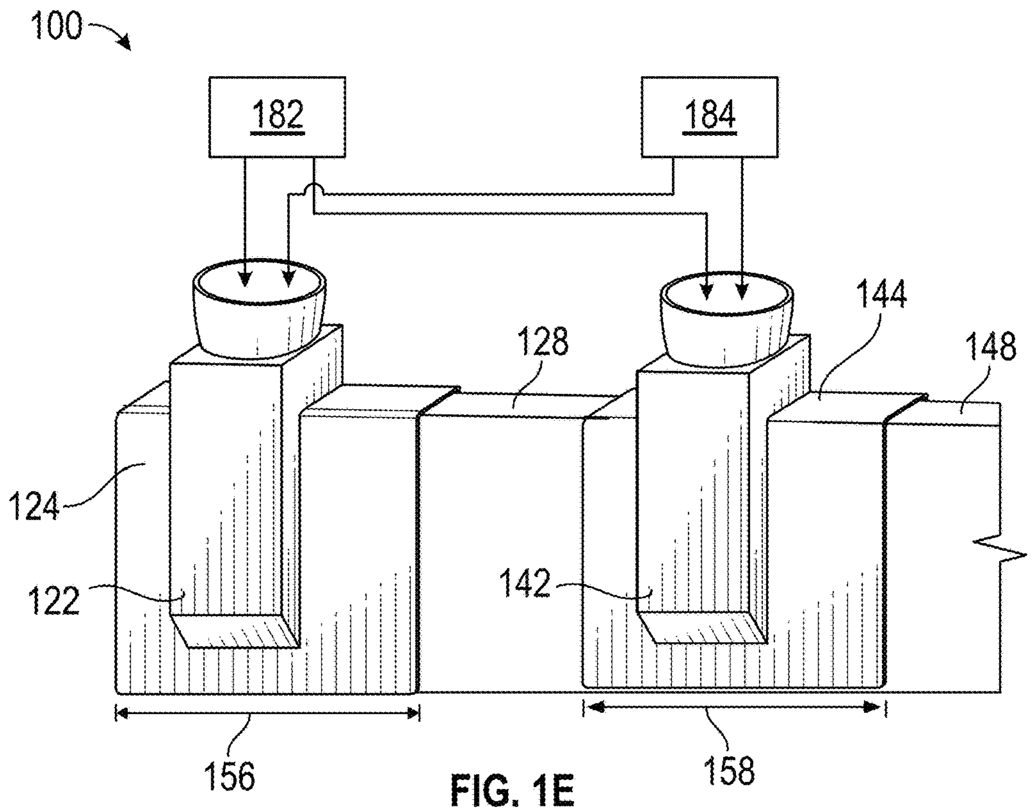
FIG. 1E shows a schematic system for slip-forming concrete structures where the second slip form mold includes a second hopper box.

FIGS. 1D-1E illustrate alternative embodiments of the second slip form mold 144. For example, FIG. 1D shows a second slip form mold 144 having a second hopper box 142 that does not extend below half the height of the resulting final concrete structure 148. The height of the second slip form mold 144 may nevertheless be between less than half the height of the resulting final concrete structure 148 to substantially the height of the final concrete structure 148. The length 156 of the first mold 124 may be less than the length 158 of the second mold 144.

FIG. 1E shows a configuration of a slip forming system 100 where the first slip form mold 124 is similar to the second slip form mold 144. For example, the first hopper box 122 may have similar dimensions (e.g., height, width, depth) as the second hopper box 142. Additionally or alternatively, the length 156 of the first mold 124 may be similar to the length 158 of the second mold 144.

Figure 1F:
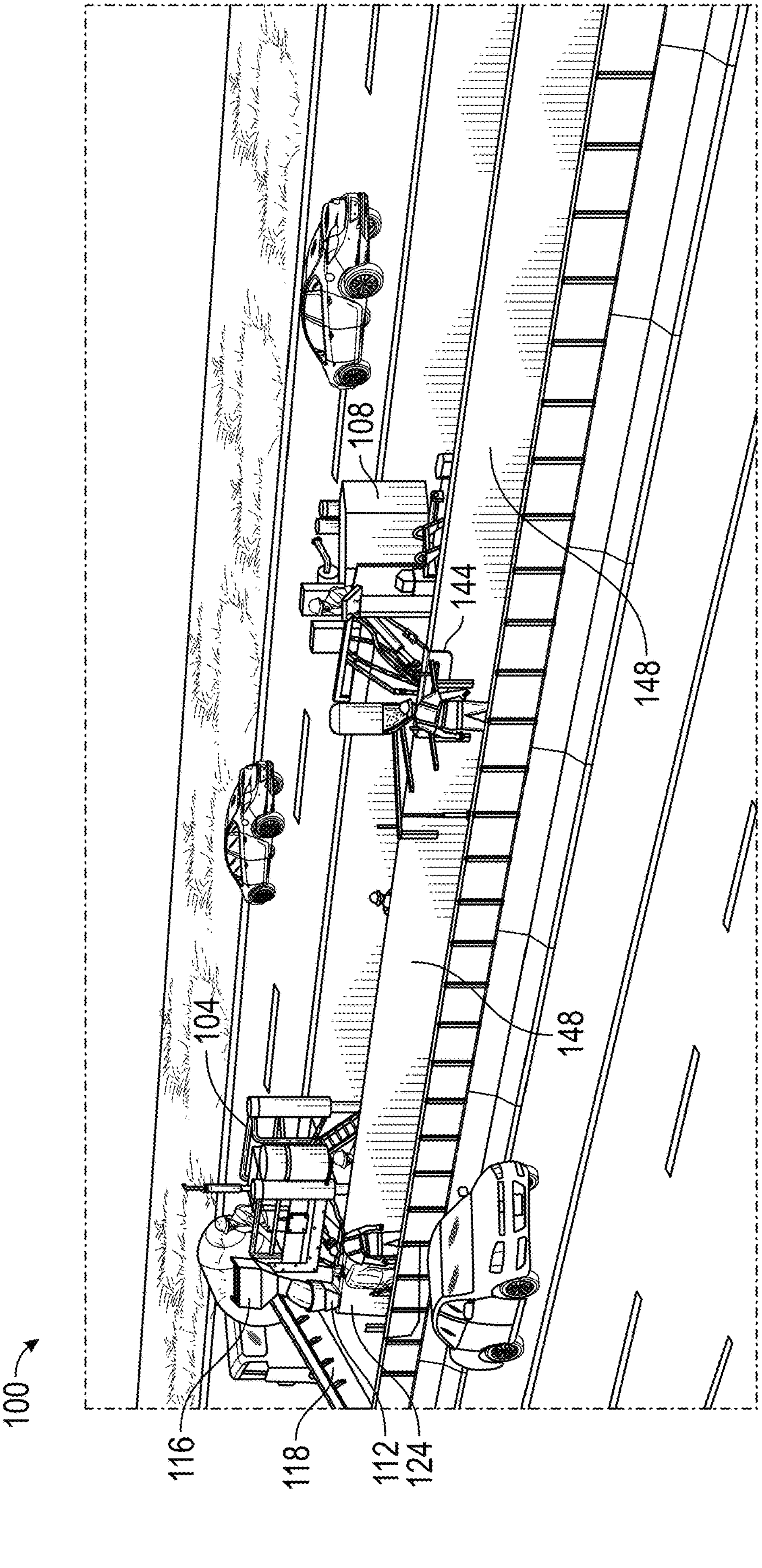
FIG. 1F illustrates a perspective view of a slip forming system of FIG. 1B.
Figure 1G:
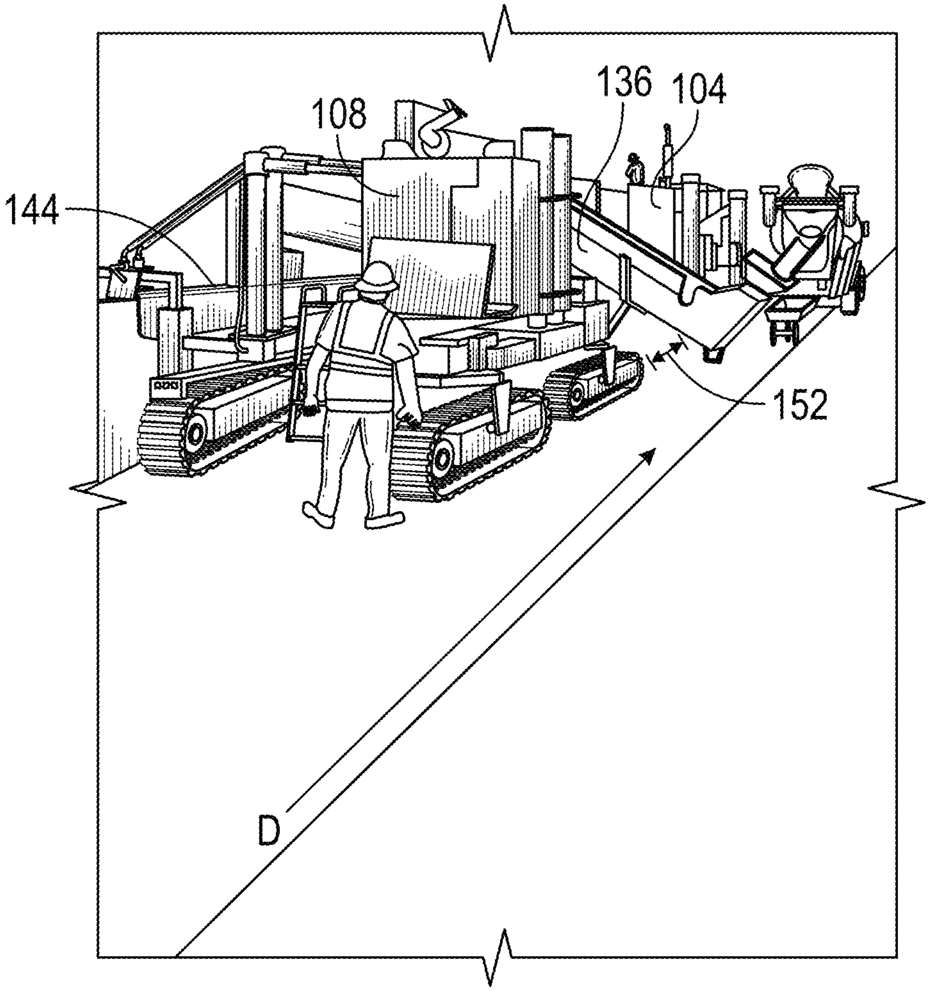
FIG. 1G illustrates a perspective back view of the slip forming system of FIG. 1B.

FIG. 1F illustrates a perspective view of a slip forming system 100 of FIG. 1C. As illustrated, the slip forming system 100 may be used to construct a concrete barrier, for example, between directions and/or lanes of vehicle traffic. In other embodiments, these systems can be used on other walls including bridge parapet work, retaining walls, water reservoir walls, decorative walls, etc. FIG. 1G illustrates a perspective back view of the slip forming system 100 of FIG. 1C. The vehicle following distance 152 is shown along a perspective view of the direction of travel D. As shown, the second slip form mold 144 can be seen from a side opposite the concrete structure relative to FIG. 1C.

Figure 1H:
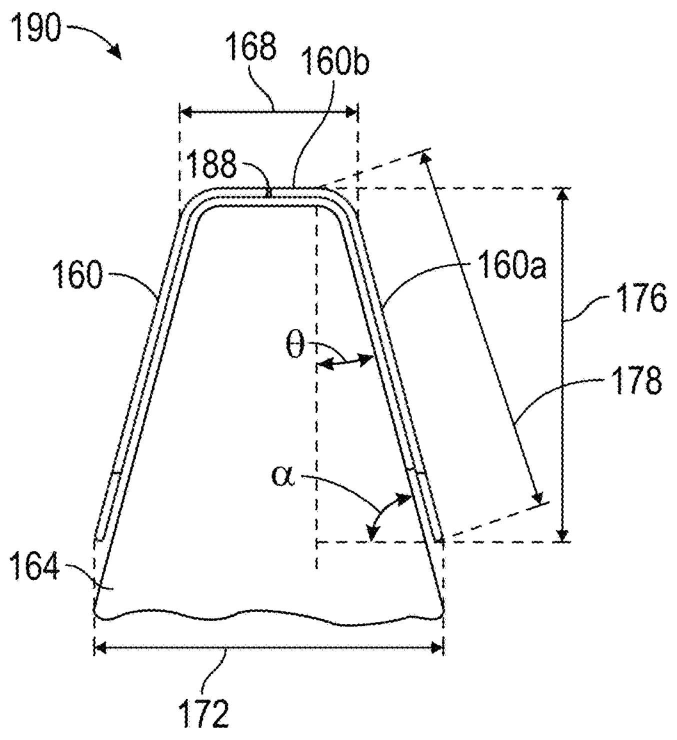
FIG. 1H schematically shows a mold profile of a slip form mold.

FIG. 1H schematically shows a mold profile 190 of a slip form mold 160. The slip form mold 160 may represent the first slip form mold 124 and/or second slip form mold 144. The slip form mold 160 is shown passing over a concrete structure 164. The concrete structure 164 may represent the preliminary concrete structure 128 and/or the final concrete structure 148. The slip form mold 160, as shown, includes a mold top 160*a* and two mold sides 160*b*. The mold top 160*a* can define an upper mold width 168. A distance between bottoms of the mold sides 160*b* can define a lower mold width 172. A ratio of the lower mold width 172 to the upper mold width 168 can be between about 0.5 to 4.0, depending on the type of concrete structure 164 that will be slip formed. This ratio can be described by a vertical rise angle θ or a horizontal rise angle α. The vertical rise angle θ and/or the horizontal rise angle α can similarly define a shape of the slip form mold 160. For example, the vertical rise angle θ can be between about −20° and 60°, when measured counterclockwise from vertical. The horizontal rise angle α can be between about 30° and 110°, when measured clockwise from horizontal. The upper mold width 168 may be between about 1 inch and 36 inches, though other widths are possible. The lower mold width 172 may be between about 3 inches and 60 inches.

The slip form mold 160 can define one or more heights. The one or more heights may be defined by the mold side 160*b*. The mold side 160*b* can define a vertical mold height 176 and/or a slanted mold height 178. The slanted mold height 178 may be different from the vertical mold height 176. The vertical mold height 176 may be between about 3 inches and 72 inches. The slanted mold height 178 may be between about 4 inches and 96 inches.

It may be advantageous to be able to manipulate a portion of the mold profile 190 in real-time. For example, a dimension (e.g., the upper mold width 168, the lower mold width 172, the vertical mold height 176, etc.) of the concrete structure 164 may need to be adjusted (e.g., due to shifting of the concrete and/or updated specifications for the dimension). Accordingly, a hinge 188 may be included in the mold profile 190. The hinge 188 may allow for adjustment of the dimension of the concrete structure 164. In some embodiments, the hinge 188 is configured to rotate a portion (e.g., half, the mold side 160*b*) of the slip form mold 160. In this way, the hinge 188 can allow a first portion (e.g., a first side) of the mold to track a path defined by the concrete structure 164 (e.g., a path going into or out of the page) while simultaneously adjusting a second portion (e.g., a second side) of the mold. The hinge 188 may be disposed anywhere within the mold profile 190. The hinge 188 can define a rotation axis. The rotation axis may be approximately parallel to a direction of travel. Alternatively or additionally, the hinge 188 may be configured to translate a portion of the mold.

Figure 2:
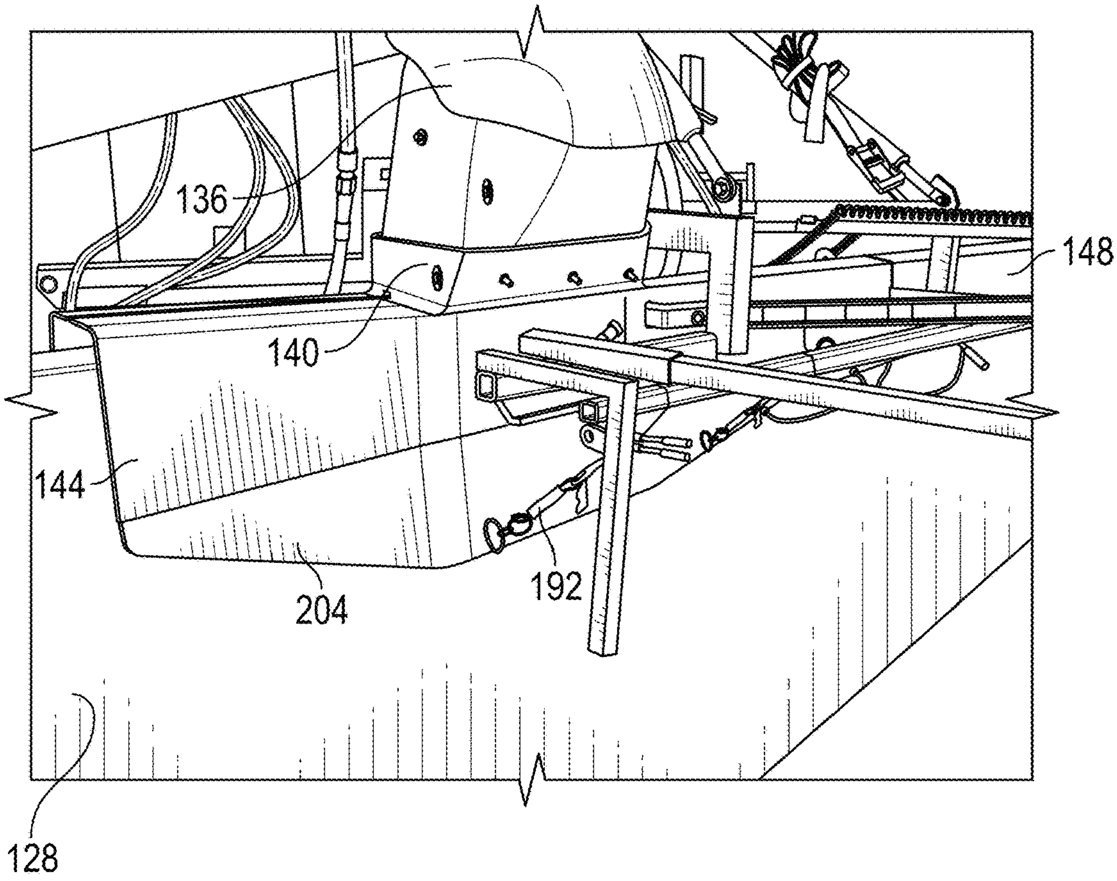
FIG. 2 illustrates a perspective view of an example embodiment of a second slip form mold.

FIG. 2 illustrates a perspective view of an example embodiment of a second slip form mold 144. As shown, a second delivery system 136 can deliver material (e.g., concrete) into the second slip form mold 144 via the second hopper 140. A preliminary concrete structure 128 is shown as well as a final concrete structure 148. FIG. 2 also shows that a second slip form mold 144 may include one or more supplemental fins 204. A supplemental fin 204 can increase a height of the second slip form mold 144. As shown, the fin may define a variable height along the length 158 of the second mold 144. The supplemental fin 204 may be integral into the second slip form mold 144. For example, the supplemental fin 204 may be welded to or formed into the second slip form mold 144. In some designs, the supplemental fin 204 is adjustable (e.g., rotatable) to allow for adjusting a tolerance of the mold.

As shown in FIG. 2, the second slip form mold 144 (and/or, under certain circumstances, the first slip form mold 124) may include an adjustment device 192. The adjustment device 192 may be configured to adjust an orientation, a lateral position, vertical position, a rotational position, and/or a tightness of tolerance of the mold and/or the supplemental fin 204. The adjustment device 192 may include a manual or automatic adjuster. The adjustment device 192 can include a ratchet system. For example, the device may include straps that include a ratcheting interface to promote precision in setting (either manually or automatically) the adjustments needed. The adjustment device 192 may employ automated systems configured to automatically set the adjustment desired. For example, the device may include a hydraulic pump, a stepper motor, or any other automated mechanical adjustment mechanism.

Figure 3:
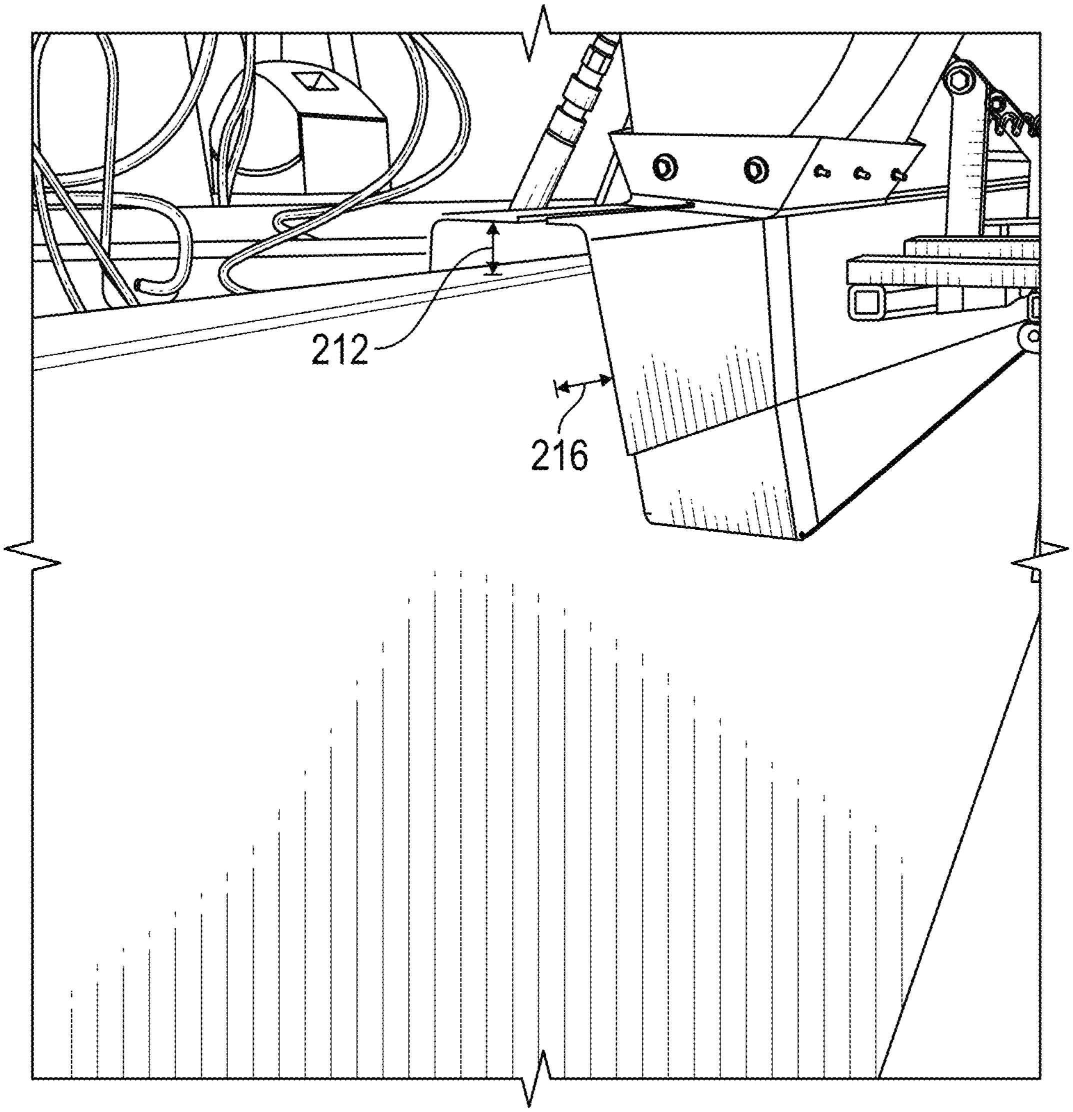
FIG. 3 shows another perspective view of the embodiment illustrated in FIG. 2.

FIG. 3 shows another perspective view of the embodiment illustrated in FIG. 2. As shown, a leading portion of the second slip form mold 144 may allow for vertical and/or horizontal clearance. For example, a leading horizontal clearance 216 of the second slip form mold 144 can account for variations in the horizontal dimensions of the preliminary concrete structure 128 before the second slip form mold 144 passes thereover. Additionally or alternatively, the second slip form mold 144 may provide for a leading vertical clearance 212. The leading vertical clearance 212 may be larger than the leading horizontal clearance 216. Imperfections in a top of the preliminary concrete structure 128 may arise due to, for example, a slumping of the concrete, an uneven surface over which the preliminary concrete structure 128 is being slip formed, a misalignment of the first slip form mold 124 and/or second slip form mold 144, and/or any other cause for variations in a height of the preliminary concrete structure 128. The leading horizontal clearance 216 and/or the leading vertical clearance 212 can be configured from between about 0.1 inch to 12 inches. Other variants are possible.

Figure 4:
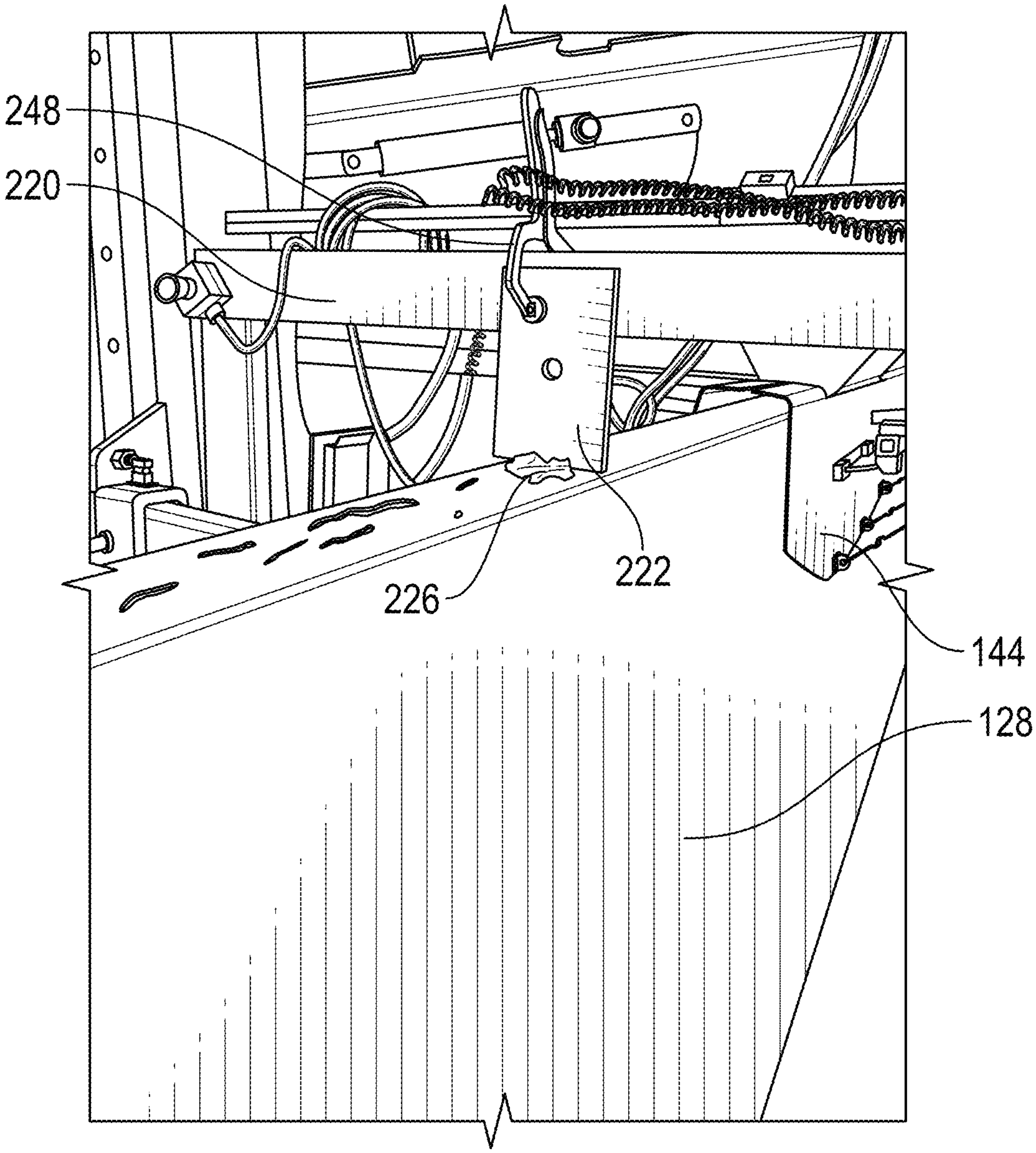
FIG. 4 illustrates an example embodiment of a slip forming system with a clearance indicator.

FIG. 4 illustrates an example embodiment of a slip forming system 100 with a clearance indicator 222. As the slip forming system 100 travels along the direction of travel D, the clearance indicator 222 may be configured to indicate a level of, for example, a height of the preliminary concrete structure 128. If the height of the preliminary concrete structure 128 is too high, the clearance indicator 222 may collect residual material 226. In this way, the clearance indicator 222 may serve as an indicator of the existence and/or extent of slump. The clearance indicator 222 may comprise a plate comprising a rigid material (e.g., metal, plastic, hardened rubber, etc.). The clearance indicator 222 can include an indicator support 220 that is rigidly attached to the second slip forming vehicle 108. The clearance indicator 222 can be attached to the second slip forming vehicle 108 using an attachment device 248. The attachment device 248 may include a temporary structure (e.g., a clamp), for example, as shown in FIG. 4. Additionally or alternatively, the attachment device 248 may include a permanent attachment structure (e.g., a weld, a slot, a snap, etc.). The attachment device 248 may allow for manual and/or automatic adjustment of the clearance indicator 222. For example, a height of the clearance indicator 222 may be adjustable.

Figure 5:
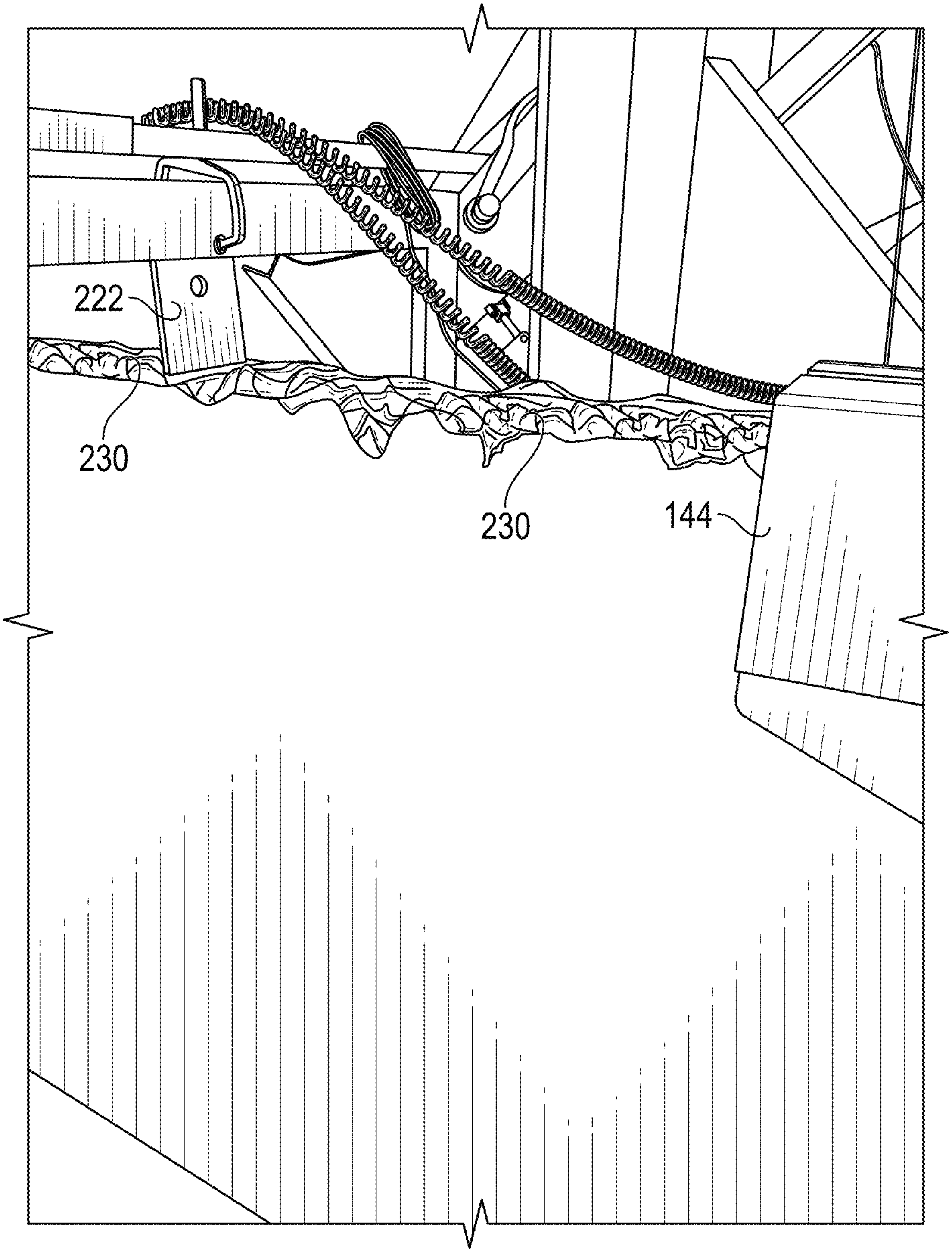
FIG. 5 illustrates the clearance indicator in relation to the second slip form mold from behind the clearance indicator along the direction of travel.

FIG. 5 illustrates the clearance indicator 222 in relation to the second slip form mold 144 from behind the clearance indicator 222 along the direction of travel D. As described above, the second slip form mold 144 can be beneficial by correcting imperfections 230 in the preliminary concrete structure 128. As shown, the preliminary concrete structure 128 comprises imperfections 230 before and after the clearance indicator 222. If the clearance indicator 222 indicates that preliminary concrete structure 128 is too low, it may accumulate residual material 226 (as described above, for example), which may deform the preliminary concrete structure 128. Accordingly, the clearance indicator 222 can promote consistency in the height of the final concrete structure 148 by removing superfluous concrete from a height of the preliminary concrete structure 128. The second slip form mold 144 can be helpful in correcting for such deformations from the clearance indicator 222 as well.

Figure 6:
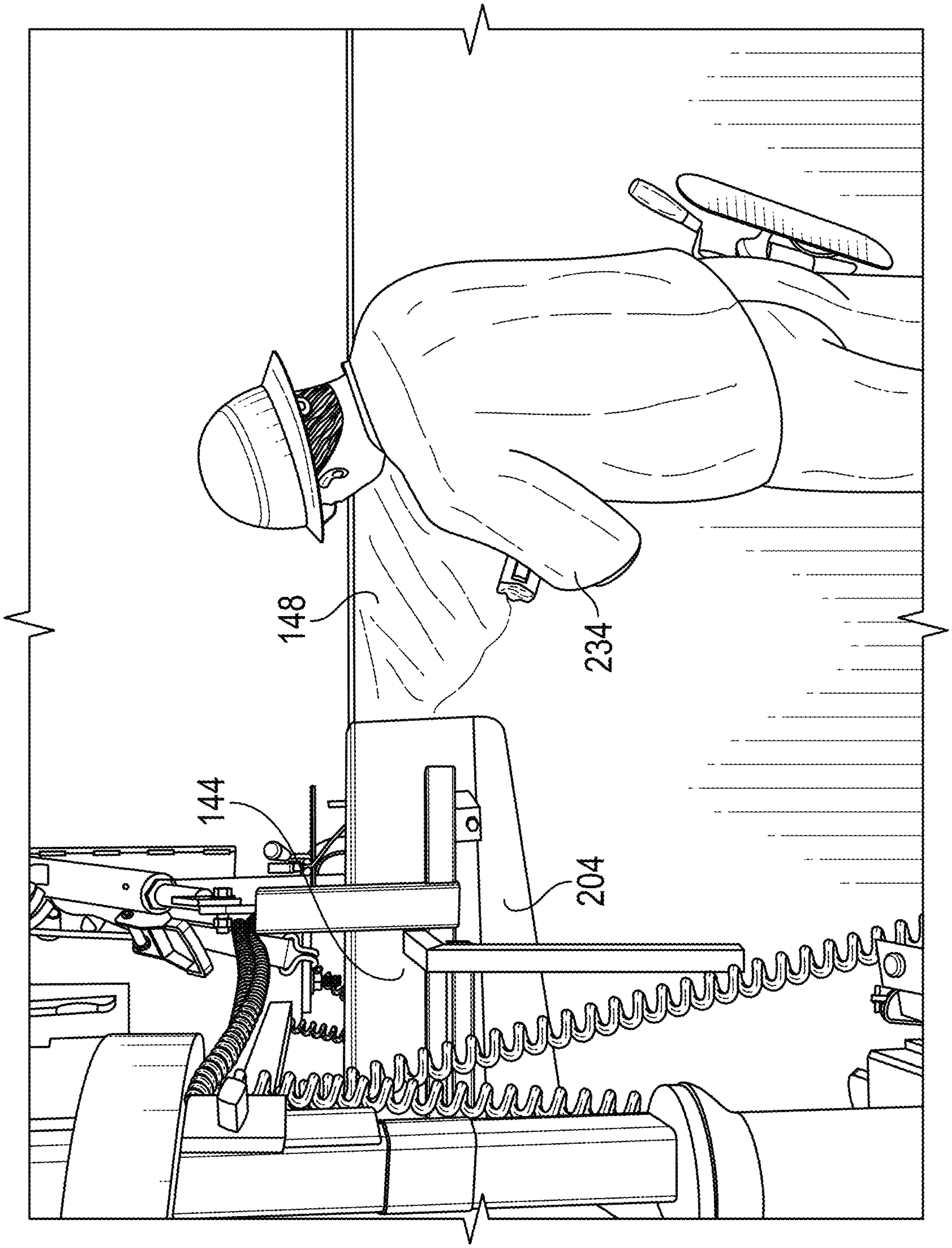
FIG. 6 illustrates a final concrete structure after the second slip form mold has corrected for such deformations or imperfections illustrated in FIG. 5.

FIG. 6 illustrates a final concrete structure 148 after the second slip form mold 144 has corrected for such deformations or imperfections 230 illustrated in FIG. 5. The final concrete structure 148 may be smooth and already satisfactory for specifications of a particular job (e.g., contract specifications). In this way, human labor can be reduced or reallocated. As shown, a worker 234 may provide minor smoothing of the concrete layer delivered by the second slip forming vehicle 108 into the layer delivered by the first slip forming vehicle 104. The worker 234 may merely serve to monitor the quality of the final concrete structure 148. It may be advantageous for a worker to supply an additional texture to the final concrete structure 148 (e.g., by brooming).

Figure 7:
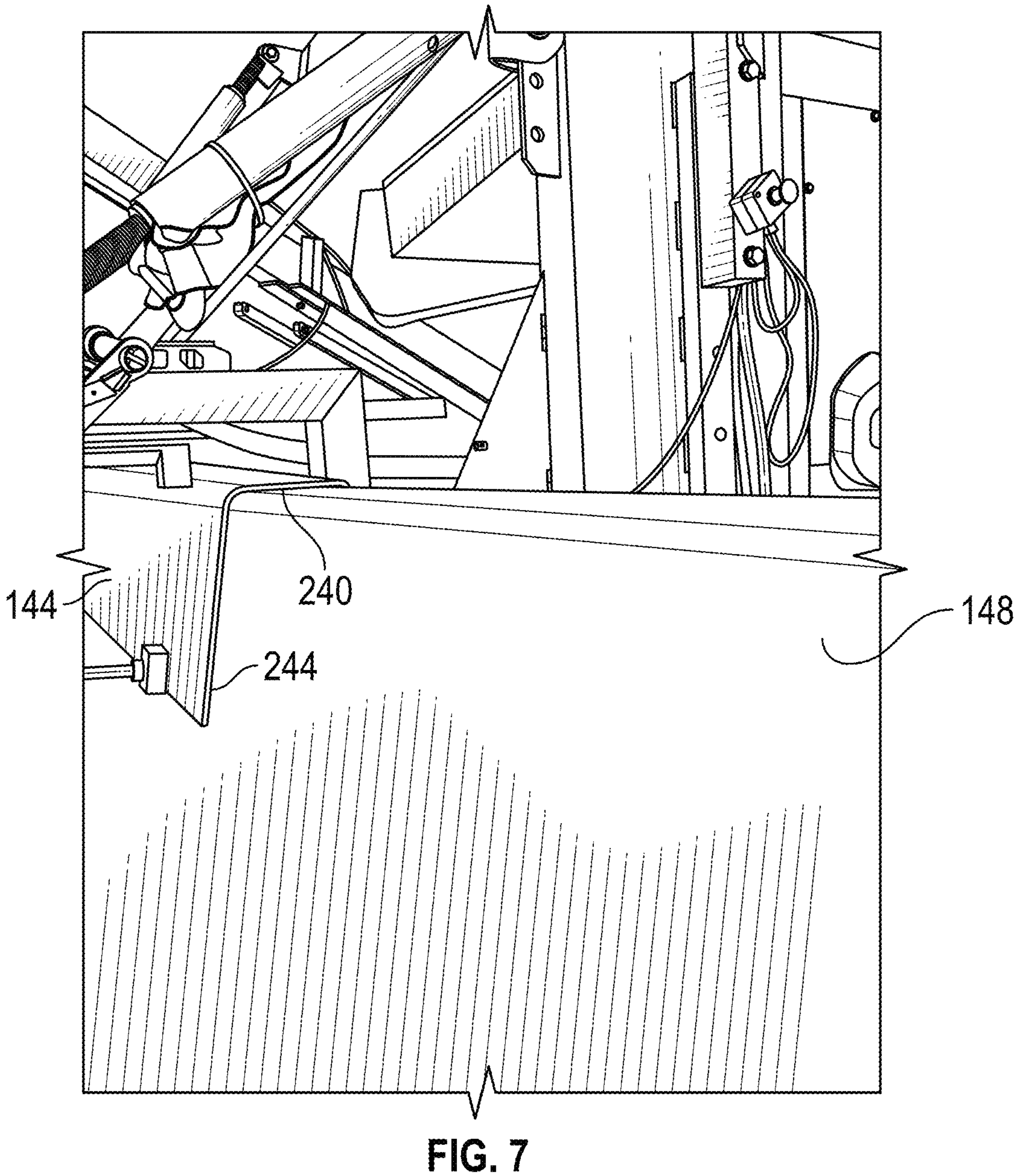
FIG. 7 illustrates the second slip form mold from a trailing end of the second slip form mold along the direction of travel.

FIG. 7 illustrates the second slip form mold 144 from a trailing end of the second slip form mold 144 along the direction of travel D. The second slip form mold 144 may define a trailing vertical clearance 240 and a trailing horizontal clearance 244. The trailing vertical clearance 240 may be less than the leading vertical clearance 212 (see FIG. 3). Additionally or alternatively, the trailing horizontal clearance 244 may be less than the leading horizontal clearance 216. This may form a gradual tapering shape in the second slip form mold 144 along the direction of travel D. Such a shape of the second slip form mold 144 can allow the second slip form mold 144 to gradually compress and form the concrete as it exits the second hopper 140 into the second slip form mold 144. As illustrated, the final concrete structure 148 may be sufficiently formed without the need of human adjustment or improvement.

A slip forming system 100 may be used in performing a slip forming method. FIGS. 8-11 show example methods of slip forming structures. Other variations of these methods are possible. For each of the FIGS. 8-11 (as well as for other figures herein), functionality of the elements and structures described herein may apply to any of the methods as understood by a person of ordinary skill in the art.

Figure 8:
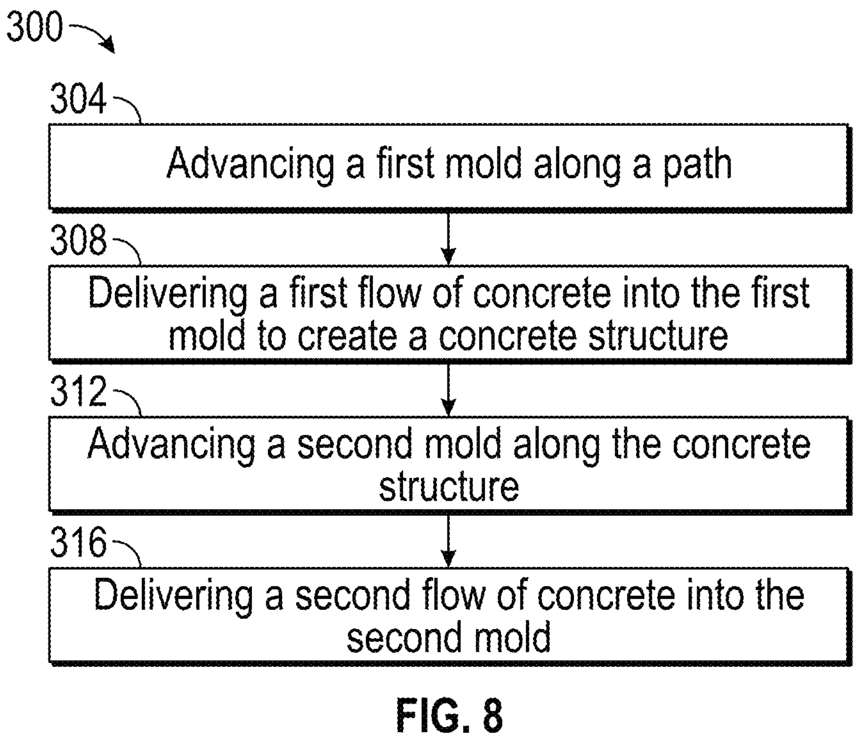
FIG. 8 shows an example method of slip forming a concrete structure.

FIG. 8 shows an example method 300 of slip forming a concrete structure. As shown at block 304, the method 300 of slip forming a concrete structure includes advancing a first mold along a path. The path may be straight, curved, or have some other shape. The path may be defined by a guide (e.g., a guide wire), a shape (e.g., natural, artificial) of the terrain, and/or a human worker (e.g., a machine operator). At block 308, the method 300 of slip forming a concrete structure includes delivering a first flow of concrete into the first mold to create a concrete structure. This concrete structure may include, for example, the preliminary concrete structure 128 described above. The first mold may include the first slip form mold 124 described above. At block 312, the method 300 can include advancing a second mold (e.g., the second slip form mold 144) along the concrete structure. In some embodiments, the concrete structure may serve partially or completely as a guide for advancing the second mold. Alternatively or additionally, the second mold may be guided by means described above (e.g., a guide wire, terrain, human operation, etc.). At block 316, the method 300 may include delivering a second flow of concrete into the second mold. The second flow of concrete may result in an updated, refined, or otherwise altered concrete structure (e.g., the final concrete structure 148).

The delivery of the second flow of concrete may occur while the second mold is advanced at block 312. The first flow of concrete may be greater than the second flow of concrete. For example, the first slip forming vehicle 104 may be configured to deliver more than 10 times a volume of concrete than the second slip forming vehicle 108 in the same time. The first slip form mold 124 may be configured to form a structure having a height of more than 15 times a height of a structure that the second slip form mold 144 may be configured to form in the same time. For example, the second slip form mold 144 may be configured to add an inch to a concrete structure while the first slip form mold 124 may be configured to add more than twenty inches of height of concrete structure to a surface. In some designs, the first mold may spatially lead the second mold along a direction of travel (e.g., the direction of travel D). It may be advantageous to deliver the first flow of concrete along a first portion of the path while simultaneously delivering the second flow of concrete along a second portion of the path (e.g., along a portion of the concrete structure).

Figure 9:
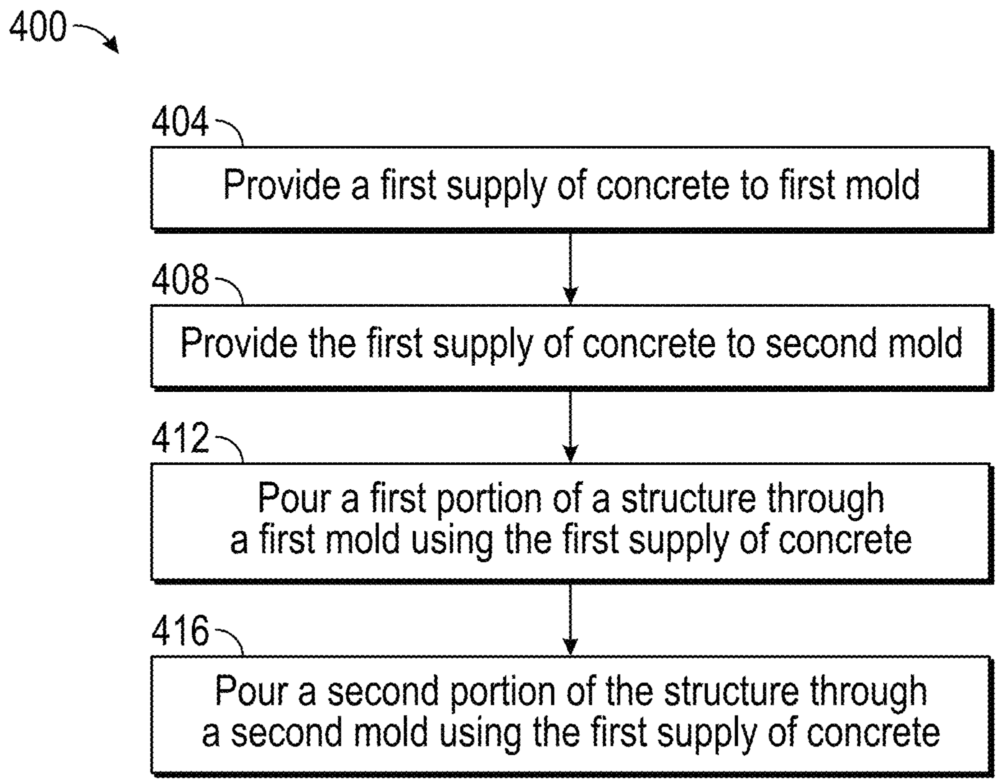
FIG. 9 shows an example method of slip forming a concrete structure.

FIG. 9 shows an example method 400. At block 404 the method 400 may include providing a first supply of concrete to a first mold. At block 408, the method may include providing the first supply of concrete to a second mold. As described herein, the use of the same supply of concrete can be advantageous as forming a more uniform structure. The first supply may be provided by another vehicle (e.g., a concrete mixer). The vehicle may supply both the first and second molds with the concrete. At block 412, the method includes pouring a first portion of a structure through a first mold using the first supply of concrete. The first and/or second molds may be any mold described herein. The first mold may have a greater height than the second mold. At block 416, the method may include pouring a second portion of the structure through a second mold using the first supply of concrete. The second mold may be configured to apply the first supply of concrete to a top of the first portion of the structure. For example, the second portion of the structure may include a top portion of a resulting combination of the first and second portions of the structure. Other variations are possible (e.g., a second portion of the structure that is laterally displaced from the first portion). In some embodiments, the first supply of concrete can be provided to the second mold before the first mold.

Figure 10:
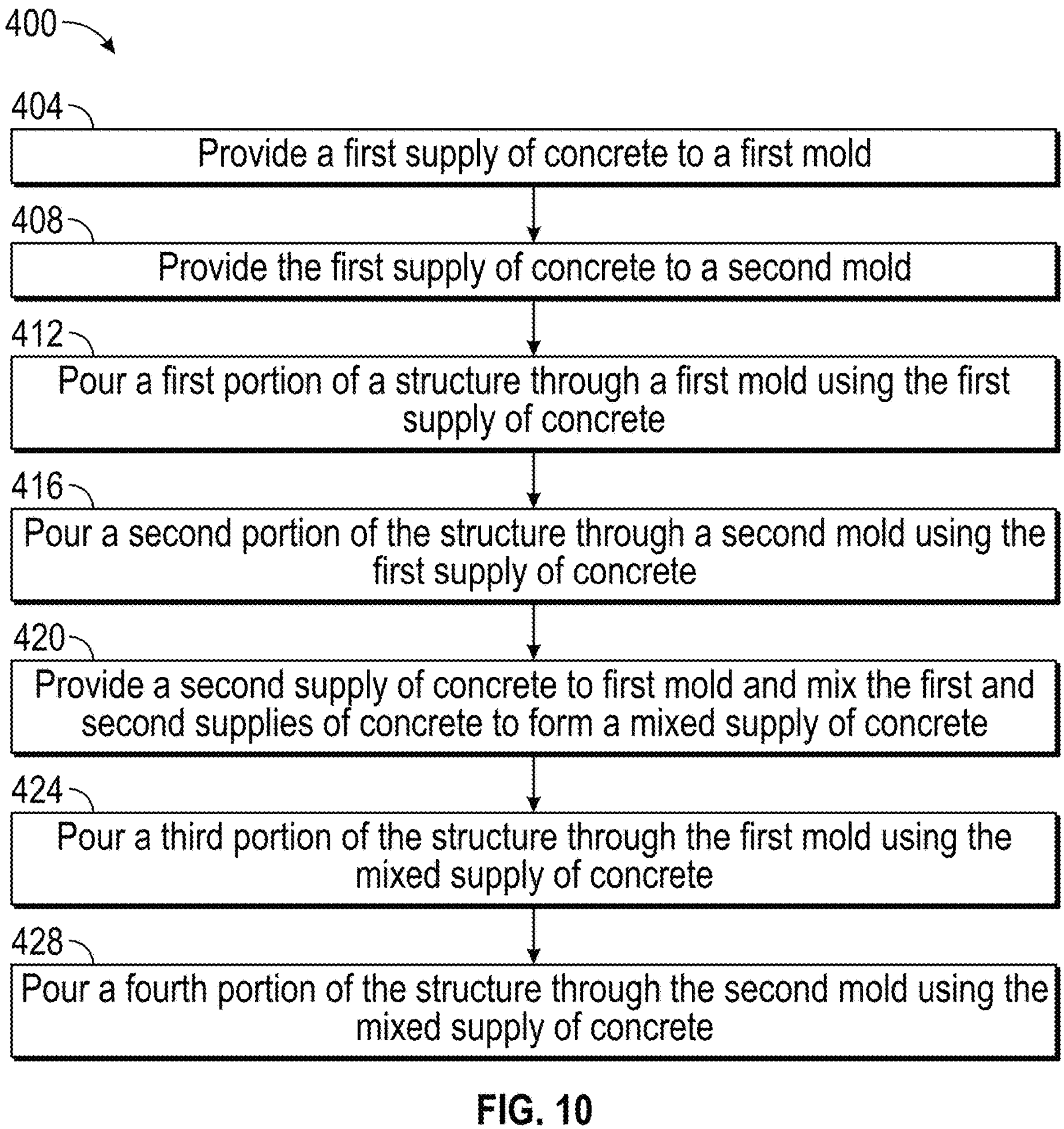
FIG. 10 shows an example method of slip forming a concrete structure.

FIG. 10 is another example of a method 400 that may be used to create a concrete structure. FIG. 10 may include one or more steps described with respect to FIG. 9, as shown. It may be advantageous to provide a second supply of concrete different from the first supply (e.g., during concrete-intensive projects). At block 420, the method includes providing a second supply of concrete to the first mold and mixing the first and second supplies of concrete to form a mixed supply of concrete. The mixed supply may be a greater proportion of the first supply than the second supply, or the reverse may be true. In some designs, the proportion of first and second supplies in the mixed supply is about 50:50. Other variations are possible.

At block 424, the method can include pouring a third portion of the structure through the first mold using the mixed supply of concrete. The third portion may be laterally displaced from the first and/or section portions of the structure. For example, the third portion may be further downstream of the first and/or second portions (e.g., along the direction of travel described herein). At block 428, the method may include pouring a fourth portion (e.g., a portion above the third portion) of the structure through the second mold using the mixed supply of concrete. The fourth portion may be analogous to the second portion and/or the third portion may be analogous to the first portion. For example, pouring the fourth and/or second portions may include modifying the respective third and/or first portions. Modifying may include adding concrete, removing concrete, and/or any other meaning as described herein.

Figure 11:
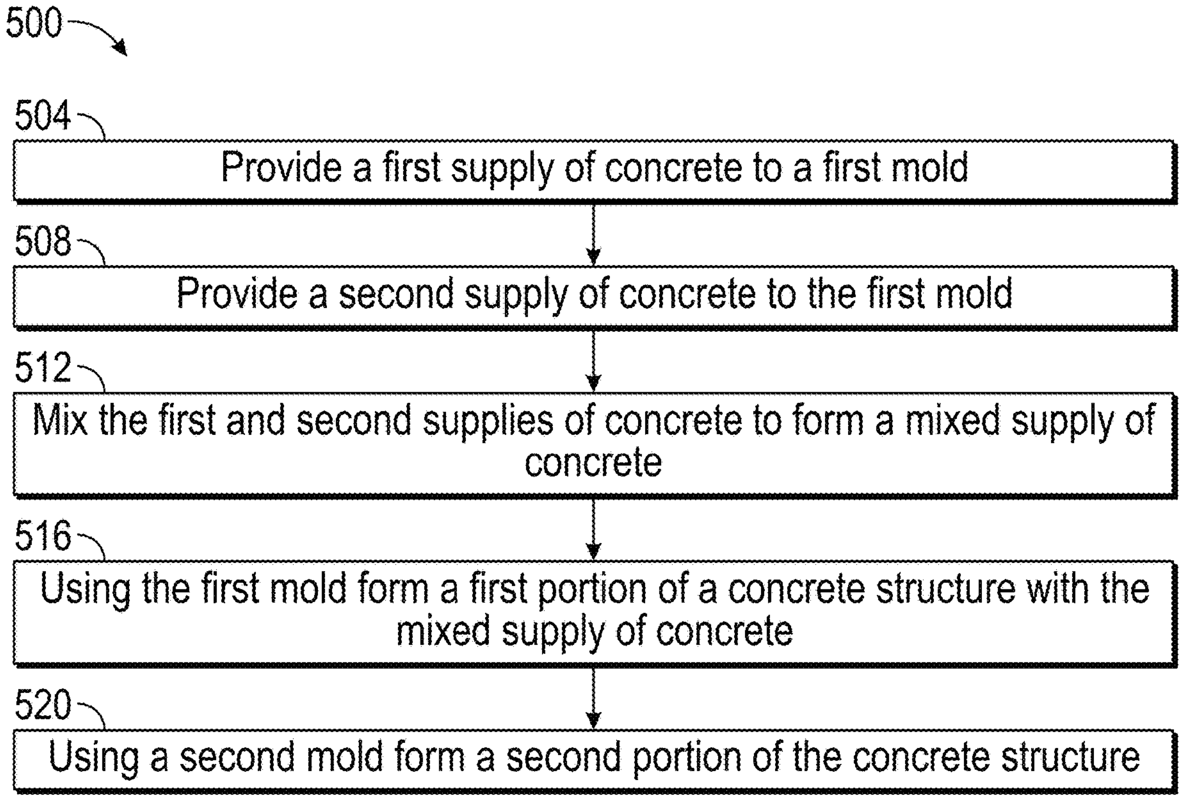
FIG. 11 shows an example method of slip forming a concrete structure.

FIG. 11 shows another example embodiment of a method 500 for forming (e.g., slip forming) a concrete structure. At block 504, the method 500 may include providing a first supply of concrete to a first mold. The first mold may be any mold herein described. A second supply of concrete may be provided to the first mold at block 508. The first and second supplies may be as described elsewhere herein. The method 500 may include mixing the first and second supplies of concrete to form a mixed supply of concrete at block 512. At block 516, the first mold may be used to form a first portion of a concrete structure using the mixed supply of concrete. The mixed supply of concrete may provide for a higher uniformity in structural aspects of the resulting structure. At block 520, a second mold may be used to form a second portion of the concrete structure. In some designs, the second portion of the concrete structure is vertically above the first portion of the concrete structure.

EXAMPLES

The following represents some examples of the systems and methods described herein.

In a 1st example, a method of slip forming a concrete structure can include: using a first slip form mold traveling along a path, forming a portion of a concrete structure by delivering a first flow of concrete into the first mold through a first hopper, the first hopper configured to receive the first flow of concrete; and using a second slip form mold different from the first mold, modifying the portion of the concrete structure by: advancing the second mold along the concrete structure; and while advancing the second mold, delivering a second flow of concrete into the second mold through a second hopper configured to receive the second flow of concrete.

In a 2nd example, the method of example 1, wherein using a first slip form mold traveling along a path comprises advancing the first slip form mold along a guide, and wherein advancing a second mold along the concrete structure comprises advancing the second slip form machine along the guide.

In a 3rd example, the method of any of examples 1-2, wherein advancing a second mold along the concrete structure comprises advancing a top of the second mold at a greater height than a height at which a top of the second mold is advanced.

In a 4th example, the method of any of examples 1-3, wherein the path advanced by the first slip form machine is substantially limited to movement within a horizontal plane.

In a 5th example, the method of any of examples 1-4, wherein forming the portion of the concrete structure comprises advancing the first mold over a structure comprising reinforcing bars.

In a 6th example, the method of any of examples 1-5, wherein the first mold has one or more dimensions different from the second mold.

In a 7th example, the method of example 6, wherein a height of the first mold is greater than a height of the second mold.

In a 8th example, the method of any of examples 6-7, wherein the second mold has a lower tolerance than the first mold.

In a 9th example, the method of any of examples 1-8, wherein using the first slip form mold traveling along the path comprises disposing the first slip form machine laterally from the portion of a concrete structure relative to a direction of travel of the first slip form machine.

In a 10th example, the method of any of examples 1-9, wherein advancing the second mold along the concrete structure comprises advancing the second mold at a rate of between approximately 3 inches/minute and 15 feet/minute.

In a 11th example, the method of any of examples 1-10, wherein delivering the second flow of concrete into the second mold through the second hopper comprises delivering the second flow of concrete nearer a leading end of the second mold than a trailing end of the second mold relative to a direction of travel.

In a 12th example, the method of any of examples 1-11, wherein delivering the first flow of concrete into the first mold through a first hopper comprises delivering a volume of concrete at a rate at least ten times a rate of the second flow of concrete into the second mold through the second hopper.

In a 13th example, a system for slip molding a concrete structure can include: a first slip forming vehicle comprising: a first hopper; a first delivery system configured to deliver a first flow of concrete to the first hopper; and a first slip form mold configured to receive the flow of concrete from the first hopper; a second slip forming vehicle comprising: a second hopper comprising a vibration device; a second delivery system configured to deliver a second flow of concrete to the second hopper; and a second slip form mold configured to receive the second flow of concrete from the second hopper, the second slip form mold spaced from the first slip form mold by a following distance.

In a 14th example, the system of example 13, wherein the second hopper comprises a vibration device configured to vibrate the concrete.

In a 15th example, the system of any of examples 13-14, wherein the following distance is between approximately 10 ft and 150 ft.

In a 16th example, the system of any of examples 13-15, wherein the following distance is between approximately 1.5 minutes and 90 minutes.

In a 17th example, the system of any of examples 13-16, wherein the first slip form mold has a height greater than a height of the second slip form mold.

In a 18th example, the system of any of examples 13-17, wherein the first slip form mold has a length along a direction of travel greater than a length of the second slip form mold.

In a 19th example, the system of any of examples 13-18, wherein the second hopper disposed nearer a leading end of the second slip form mold than a trailing end of the second slip form mold in relation to a direction of travel.

In a 20th example, the system of any of examples 13-19, wherein the second slip forming vehicle further comprises a clearance indicator disposed between the first slip form mold and the second slip form mold.

In a 21th example, a system for modifying an existing concrete structure includes: a modifying mold configured to extend across a top portion of an existing concrete structure and to extend at least partially along a side portion of the existing concrete structure, the modifying mold configured to travel along a substantially horizontal direction of travel and to be guided along at least one side of the existing concrete structure; a concrete delivery system in fluid communication with the modifying mold, the concrete delivery system configured to receive liquid concrete; a vibrator configured to promote a fluid consistency of the liquid concrete, the vibrator in fluid communication with the concrete delivery system and with the modifying mold.

In a 22nd example, the system of example 21, wherein the modifying mold comprises a hinge and wherein a portion of the modifying mold is configured to be rotatable relative to the hinge, the hinge defining a rotational axis substantially parallel to the substantially horizontal direction of travel.

In a 23rd example, the system of any of examples 21-22, wherein the system further comprises a forming mold configured to shape the existing concrete structure into a structure having a top and at least one side.

In a 24th example, the system of example 23, wherein a distance between a trailing portion of the forming mold and a leading portion of the modifying mold is between approximately 8 ft and 150 ft, wherein the trailing portion and the leading portion are determined based on the direction of travel.

In a 25th example, the system of any of examples 21-24, wherein the existing concrete structure is in a plastic phase when the modifying mold travels along the existing concrete structure.

In a 26th example, a system for modifying an existing structure includes: a modifying mold configured to extend across a top portion of an existing structure and to extend at least partially along a side portion of the existing structure, the modifying mold configured to travel along a substantially horizontal direction of travel and to be guided along at least one side of the existing structure; a material delivery system in fluid communication with the modifying mold, the material delivery system configured to receive liquid material; a vibrator configured to promote a fluid consistency of the liquid material, the vibrator in fluid communication with the material delivery system and with the modifying mold.

In a 27th example, the system of example 26, wherein the modifying mold comprises a hinge and wherein a portion of the modifying mold is configured to be rotatable relative to the hinge, the hinge defining a rotational axis substantially parallel to the substantially horizontal direction of travel.

In a 28th example, the system of any of examples 26-27, wherein the system further comprises a forming mold configured to shape the existing structure into a structure having a top and at least one side.

In a 29th example, the system of example 28, wherein a distance between a trailing portion of the forming mold and a leading portion of the modifying mold is between approximately 8 ft and 150 ft, wherein the trailing portion and the leading portion are determined based on the direction of travel.

Conclusion

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim or example require more features than are expressly recited in that claim or example. Rather, inventive aspects lie in a combination of fewer than all features of any single foregoing disclosed embodiment. Accordingly, no feature or group of features is necessary or indispensable to each embodiment.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the example embodiments which follow should not be limited by the particular embodiments described above.

What is claimed:

1. A method of slip forming a concrete structure, the method comprising:

using a first slip form mold, forming a portion of a concrete structure by delivering a first flow of concrete through a top of the first mold through a first hopper, the first hopper configured to receive the first flow of concrete; and using a second slip form mold different from the first mold, modifying the portion of the concrete structure by:

tracking, using one or more sensors, a guide associated with the first slip form mold or the second slip form; and delivering a second flow of concrete.

2. The method of claim 1, wherein using the first slip form mold comprises advancing the first slip form mold along the guide, and wherein the method further comprises advancing the second mold along the concrete structure by advancing the second slip form along the guide and delivering the second flow of concrete through the top of the second mold.

3. The method of any of claim 2, wherein advancing the second mold along the concrete structure comprises advancing a top of the second mold at a greater height than a height at which a top of the first mold is advanced.

4. The method of any of claim 2, wherein a path advanced by the first slip form is substantially limited to movement within a horizontal plane.

5. The method of any of claim 1, wherein forming the portion of the concrete structure comprises advancing the first mold over a structure comprising reinforcing bars.

6. The method of any of claim 1, further comprising delivering the second flow of concrete through the top of the second mold, wherein the first mold has one or more dimensions different from the second mold.

7. The method of claim 6, wherein a height of the first mold is greater than a height of the second mold.

8. The method of any of claim 6, wherein the second mold has a tighter tolerance than the first mold, wherein the tighter tolerance results from being more rigid than the first mold.

9. The method of any of claim 1, wherein using the first slip form mold comprises disposing the first slip form laterally from the portion of a concrete structure relative to a direction of travel of the first slip form.

10. The method of any of claim 2, wherein advancing the second mold along the concrete structure comprises advancing the second mold at a rate of between approximately 0.25 feet/minute and 15 feet/minute.

11. The method of any of claim 2, wherein delivering the second flow of concrete into the second mold through the second hopper comprises delivering the second flow of concrete nearer a leading end of the second mold than a trailing end of the second mold relative to a direction of travel.

12. The method of any of claim 2, wherein delivering the first flow of concrete into the first mold through a first hopper comprises delivering a volume of concrete at a rate at least ten times a rate of the second flow of concrete into the second mold through the second hopper.

* * * * *